US012695111B2

(12) United States Patent
Miyazaki

(10) Patent No.: US 12,695,111 B2
(45) Date of Patent: Jul. 28, 2026

(54) WIRE BONDING APPARATUS AND CONTROL METHOD

(71) Applicant: HIRATA CORPORATION, Kumamoto (JP)

(72) Inventor: Toru Miyazaki, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 538 days.

(21) Appl. No.: 18/474,497

(22) Filed: Sep. 26, 2023

(65) Prior Publication Data

US 2024/0014432 A1 Jan. 11, 2024

Related U.S. Application Data

(63) Continuation of application No. PCT/JP2021/013360, filed on Mar. 29, 2021.

(51) Int. Cl.
B23K 20/00 (2006.01)
B23K 20/26 (2006.01)
(Continued)

(52) U.S. Cl.
CPC ....... H01M 10/0404 (2013.01); B23K 20/004 (2013.01); B23K 20/26 (2013.01); *B23K 2101/38* (2018.08); *H01M 50/516* (2021.01)

(58) Field of Classification Search
CPC ............ H01M 10/0404; H01M 50/516; B23K 20/004; B23K 20/005; B23K 20/007;
(Continued)

(56) References Cited

U.S. PATENT DOCUMENTS 4,763,827 A * 8/1988 Watanabe ............ B23K 20/005
228/6.2
5,549,716 A * 8/1996 Takahashi ......... H10W 72/0711
29/827
(Continued)

FOREIGN PATENT DOCUMENTS

CN 101522356 B * 1/2012 ............ H10W 99/00
CN 105552002 A * 5/2016 ............ H10W 70/05
(Continued)

OTHER PUBLICATIONS

Extended European Search Report dated Apr. 8, 2024, issued in corresponding European Application No. 21934797.8. (9 pages).
(Continued)

*Primary Examiner* — Kiley S Stoner
(74) *Attorney, Agent, or Firm* — Buchanan Ingersoll & Rooney PC

(57) ABSTRACT

A wire bonding apparatus includes a conveying unit configured to convey a pallet on which a work is placed, at least one bonding head configured to perform wire bonding for the work, and a moving unit configured to move the at least one bonding head. The conveying unit includes a first conveying unit configured to convey the pallet to a work region, and a second conveying unit configured to convey the pallet in the work region. The second conveying unit includes a table with a positioning unit configured to positioning the pallet, a second moving mechanism configured to repeat moving the table and stopping the table. A positioning state of the pallet by the positioning unit is kept while the pallet is conveyed, and the at least one bonding head performs work for the work.

16 Claims, 20 Drawing Sheets

(51) Int. Cl.
_H01M 10/04_ (2006.01)
_B23K 101/38_ (2006.01)
_H01M 50/516_ (2021.01)

(58) Field of Classification Search
CPC ................ B23K 20/26; B23K 2101/38; B23K
37/04–047; H10W 72/0711; H10P
72/0444
USPC ..................... 228/180.5, 4.5, 904, 47.1–49.5
See application file for complete search history.

(56) References Cited

U.S. PATENT DOCUMENTS

| | | | | |
|---|---|---|---|---|
| 5,813,590 A | * | 9/1998 | Fogal ................. | H10W 72/075 |
| | | | | 228/45 |
| 5,898,214 A | | 4/1999 | Miura | |
| 2002/0162875 A1 | * | 11/2002 | Miller .................... | B23K 20/10 |
| | | | | 228/180.5 |
| 2005/0109815 A1 | * | 5/2005 | Kakutani ............. | B23K 20/004 |
| | | | | 228/9 |
| 2005/0247758 A1 | * | 11/2005 | Beatson ............... | B23K 20/004 |
| | | | | 228/103 |
| 2006/0060631 A1 | * | 3/2006 | Frasch ................. | B23K 20/004 |
| | | | | 228/4.5 |
| 2009/0124028 A1 | * | 5/2009 | Hayata ................... | H04N 23/54 |
| | | | | 438/16 |
| 2010/0059574 A1 | * | 3/2010 | Arahata ............... | B23K 20/007 |
| | | | | 228/110.1 |
| 2012/0031955 A1 | * | 2/2012 | Pham ................... | B23K 20/005 |
| | | | | 228/49.5 |
| 2017/0291251 A1 | * | 10/2017 | Hayata ................. | B23K 20/002 |
| 2023/0125756 A1 | * | 4/2023 | Kakutani ............. | B23K 20/004 |
| | | | | 228/1.1 |
| 2024/0014432 A1 | * | 1/2024 | Miyazaki .......... | H01M 10/0404 |

FOREIGN PATENT DOCUMENTS

| | | | | | |
|---|---|---|---|---|---|
| CN | 105590874 A | * | 5/2016 | ........ | H10W 72/0711 |
| DE | 4337513 A1 | * | 5/1995 | .......... | B23K 20/005 |
| DE | 102010024623 A1 | * | 12/2011 | .............. | B23Q 1/44 |
| JP | S5052973 A | | 5/1975 | | |
| JP | S59231827 A | | 12/1984 | | |
| JP | S60154535 A | | 8/1985 | | |
| JP | S60192444 A | | 12/1985 | | |
| JP | S62147343 A | | 7/1987 | | |
| JP | S62150831 A | | 7/1987 | | |
| JP | H03106042 A | | 5/1991 | | |
| JP | H11135543 A | | 5/1999 | | |
| JP | 2000031193 A | | 1/2000 | | |
| JP | 2003068788 A | | 3/2003 | | |
| JP | 2004111838 A | * | 4/2004 | ....... | H10W 72/0711 |
| JP | 3891689 B2 | * | 3/2007 | ........ | H10W 72/0711 |
| JP | 4252700 B2 | * | 4/2009 | ........ | H10W 72/0711 |
| JP | 4381468 B1 | * | 12/2009 | .............. | G12B 5/00 |
| JP | 2010123771 A | | 6/2010 | | |
| JP | 2012114477 A | * | 6/2012 | ........ | H10W 72/0198 |
| JP | 2015126007 A | | 7/2015 | | |
| JP | 2015153907 A | | 8/2015 | | |
| KR | 200174660 Y1 | * | 3/2000 | ........ | H10W 72/0711 |
| KR | 20080050978 A | * | 6/2008 | ........ | H10W 72/0711 |
| KR | 100273881 B1 | * | 1/2011 | ........ | H10W 72/0711 |
| TW | I385739 B | * | 2/2013 | ........... | B23K 20/007 |
| WO | WO-2015190471 A1 | * | 12/2015 | ............. | G01B 11/00 |
| WO | WO-2018029881 A1 | * | 2/2018 | ......... | H10P 72/3411 |
| WO | 2019044816 A1 | | 3/2019 | | |

OTHER PUBLICATIONS

International Search Report (PCT/ISA/210) with translation and Written Opinion (PCT/ISA/237) mailed on Jun. 15, 2021, by the Japan Patent Office as the International Searching Authority for International Application No. PCT/JP2021/013360. (14 pages).
IPRP mailed on Apr. 5, 2023, by the Japan Patent Office for Application No. PCT/JP2021/013360. (20 pages).

\* cited by examiner

F I G.  5
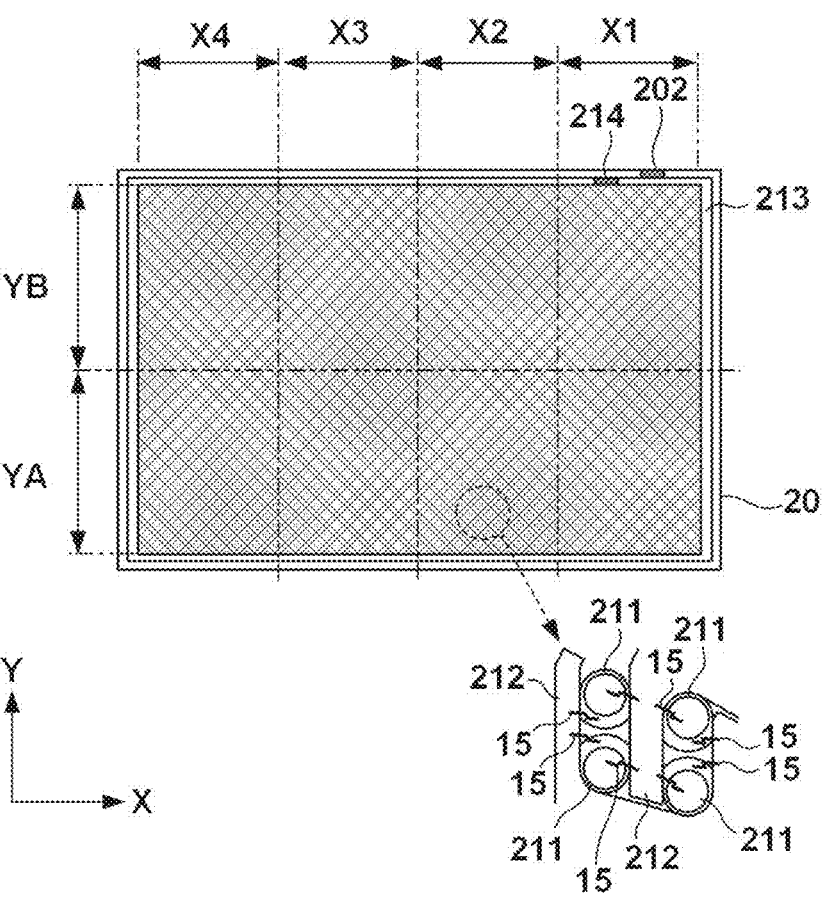

F I G. 8
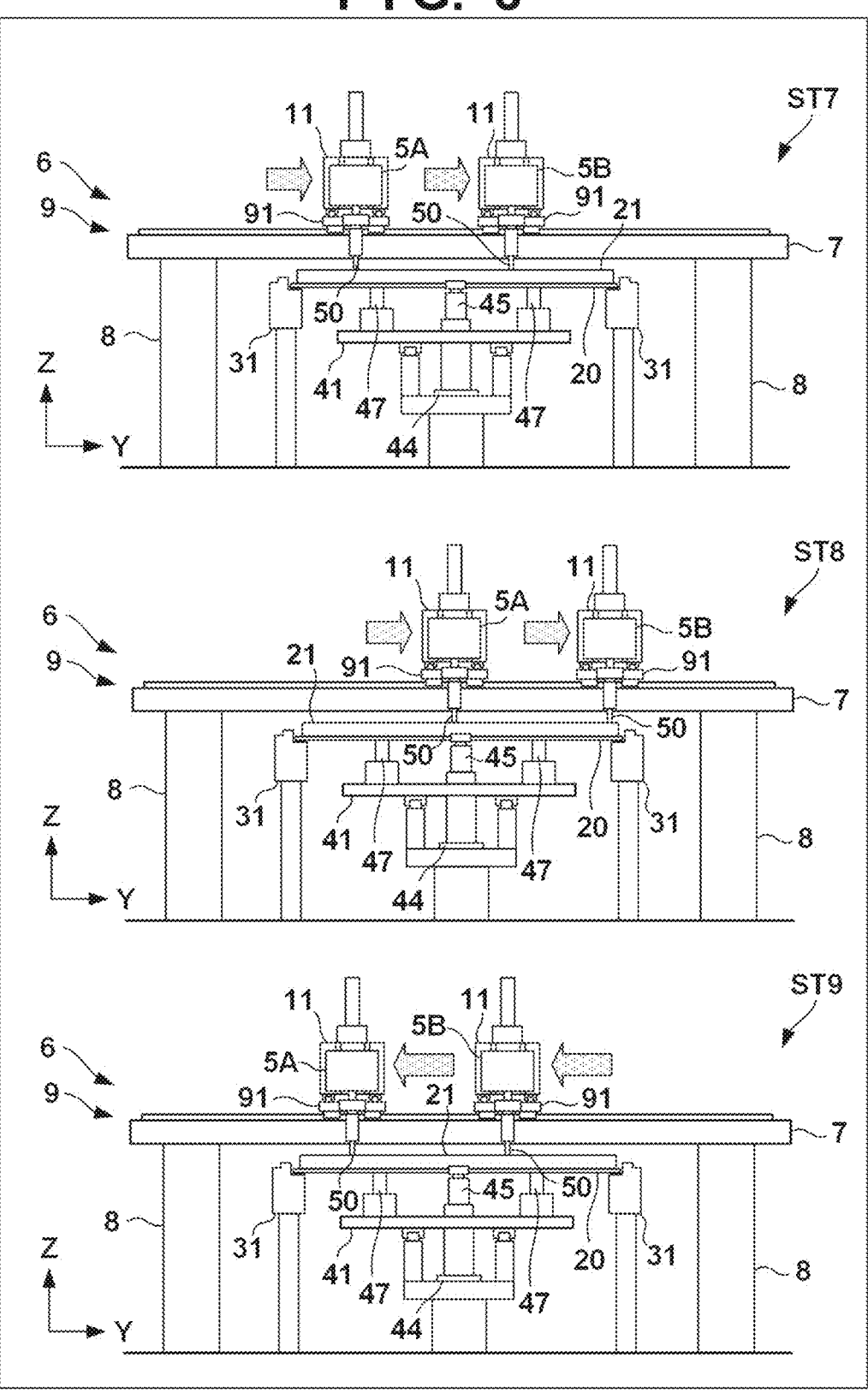

F I G. 10
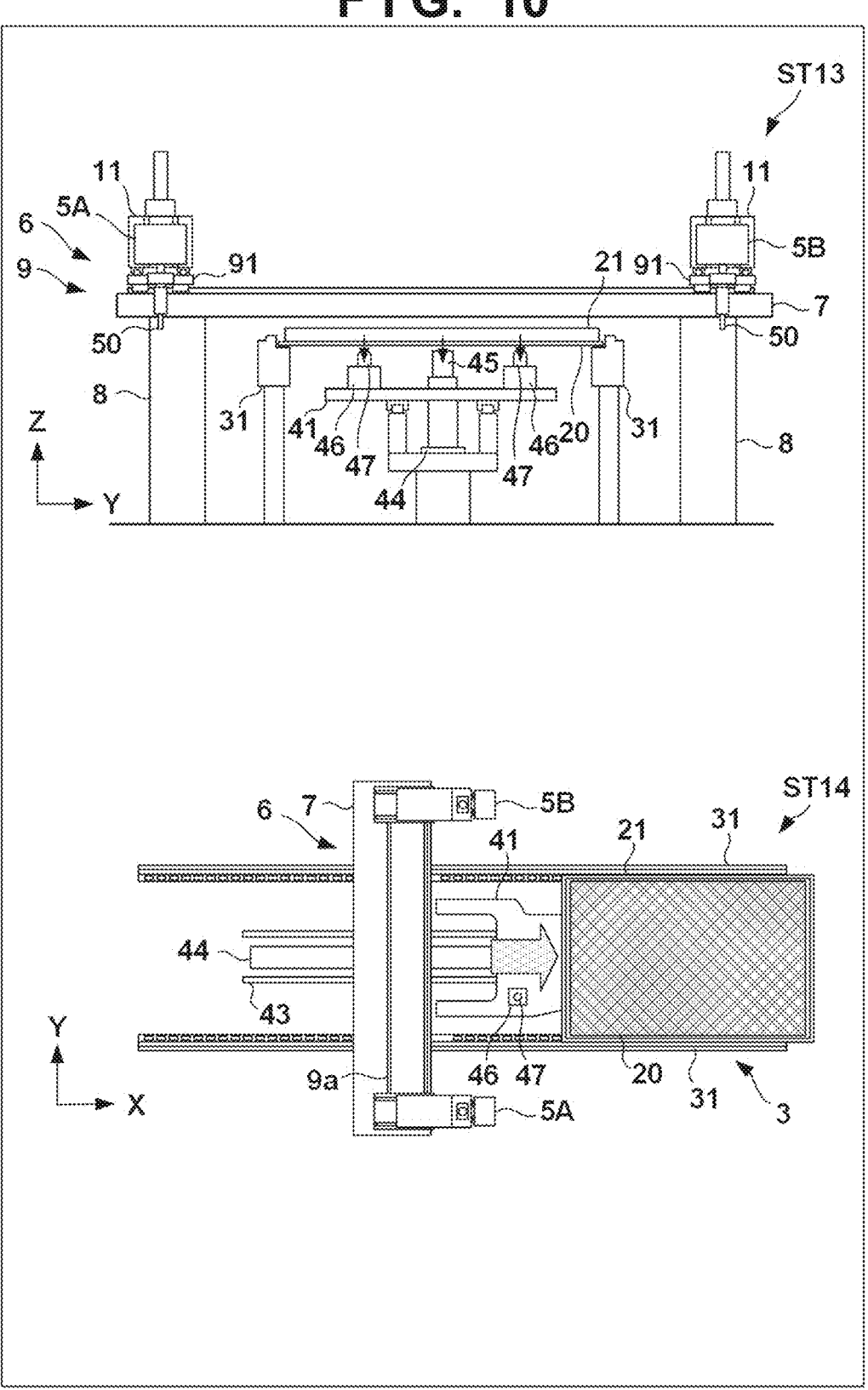

FIG. 12

F I G.  15
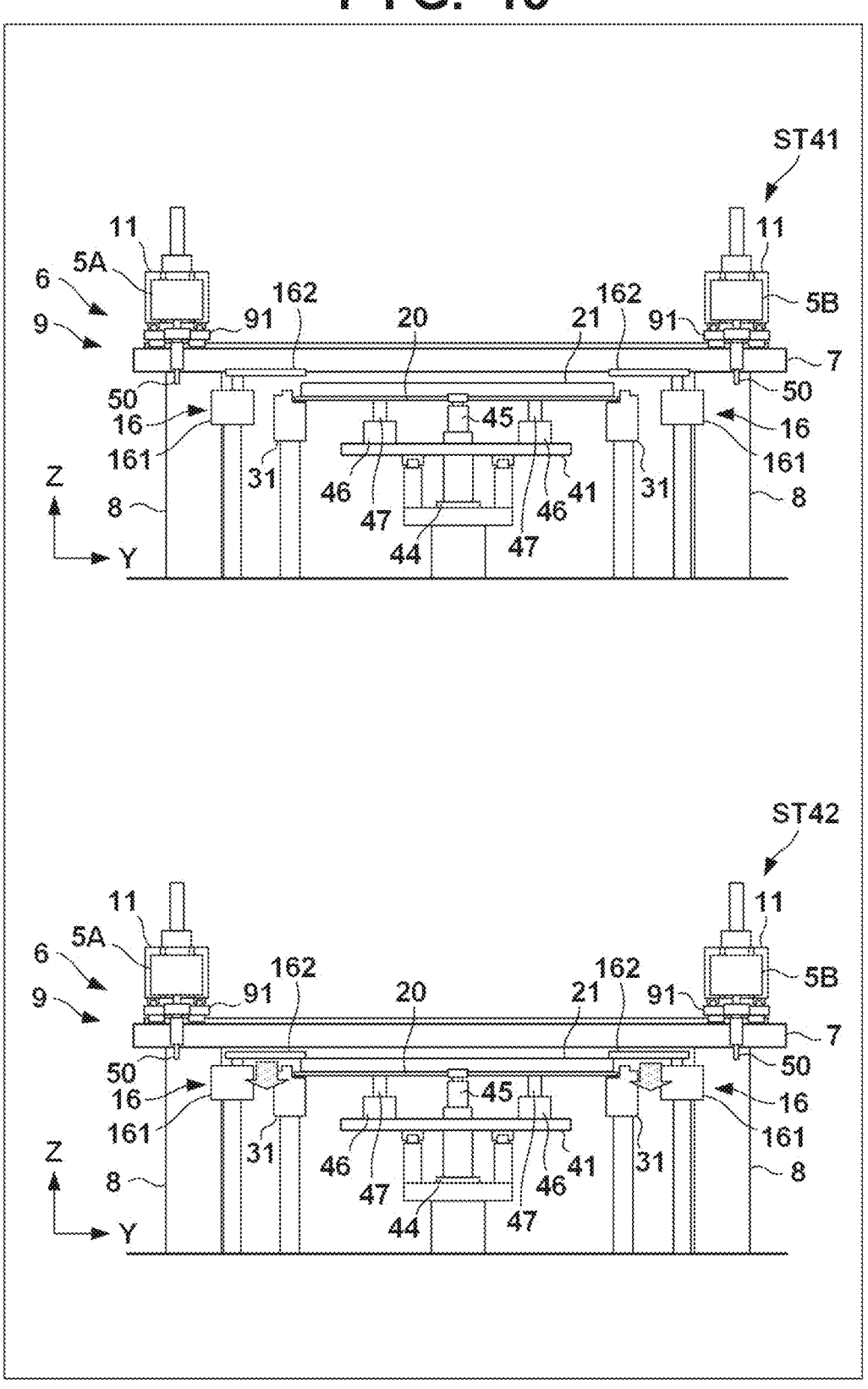

F I G. 17
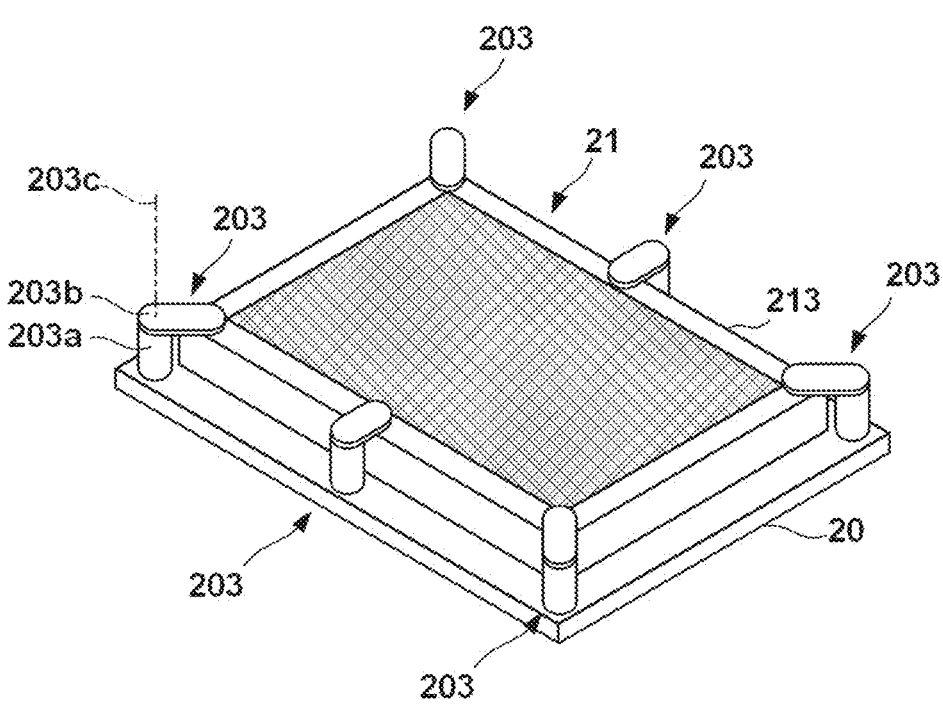

WIRE BONDING APPARATUS AND CONTROL METHOD

CROSS-REFERENCE TO RELATED APPLICATION(S)

This application is a continuation of International Patent Application No. PCT/JP2021/013360, filed Mar. 29, 2021, the entire disclosures of which is incorporated herein by reference.

BACKGROUND OF THE INVENTION

Field of the Invention

The present invention relates to a wire bonding apparatus.

Description of the Related Art

A wire bonding apparatus is known as an apparatus that automates the work of connecting electronic components with wires. Japanese Patent Laid-Open No. 59-231827 and Japanese Utility Model Laid-Open No. 62-147343 each disclose an apparatus that performs connecting work while moving a bonding head.

A large battery like an on-board lithium-ion battery has been developed. In forming such a battery, many battery cells and bus bars need to be connected with wires. In Japanese Patent Laid-Open No. 59-231827 and Japanese Utility Model Laid-Open No. 62-147343, relatively small electronic components such as semiconductor components are connection targets, and the moving distance of the bonding head is relatively short. When the apparatus disclosed in each of Japanese Patent Laid-Open No. 59-231827 and Japanese Utility Model Laid-Open No. 62-147343 is applied to wire bonding in a large battery, since the work area is small, the work efficiency is low. As the work area increases, the support rigidity of the bonding head decreases. This sometimes causes a deterioration in the position accuracy of the bonding head.

SUMMARY OF THE INVENTION

It is an object of the present invention to provide a wire bonding apparatus that has high support rigidity while allowing an increase in the work area of the bonding head.

According to the present invention, there is provided a wire bonding apparatus comprising:

a conveying unit configured to convey in a first direction a pallet on which a work is placed;

at least one bonding head configured to perform wire bonding for the work; and a moving unit configured to move the at least one bonding head, the moving unit including a beam member located above the conveying unit and extending in a second direction intersecting the first direction so as to cross the conveying unit, a first columnar member configured to support one end portion of the beam member, a second columnar member configured to support the other end portion of the beam member, and a first moving mechanism configured to be supported on the beam member and move the at least one bonding head in the second direction, the conveying unit including a first conveying unit configured to convey the pallet to a work region where the at least one bonding head performs work for the work, and a second conveying unit configured to convey the pallet in the work region, the second conveying unit including a table with a positioning unit configured to positioning the pallet, a second moving mechanism configured to repeat moving the table in the first direction and stopping the table, wherein the at least one bonding head performs work for the work placed on the pallet located in the work region while the second moving mechanism stops, and wherein a positioning state of the pallet by the positioning unit is kept while the pallet is conveyed by the second conveying unit, and the at least one bonding head performs work for the work.

Further features of the present invention will become apparent from the following description of exemplary embodiments (with reference to the attached drawings).

BRIEF DESCRIPTION OF THE DRAWINGS

FIG. 1 is a plan view of a wire bonding apparatus according to an embodiment of the present invention;

FIG. 2 is a right side view of the wire bonding apparatus in FIG. 1;

FIG. 3 is a front view of the wire bonding apparatus in FIG. 1;

FIG. 5 is a view for explaining a work and a work procedure;

FIG. 8 is a view for explaining the operation of the wire bonding apparatus in FIG. 1;

FIG. 10 is a view for explaining the operation of the wire bonding apparatus in FIG. 1;

FIG. 12 is a view for explaining a wire bonding apparatus according to another embodiment;

FIG. 15 is a view for explaining the operation of the restriction unit in FIG. 14;

FIG. 17 is a perspective view of a pallet including a restriction unit and a work;

DESCRIPTION OF THE EMBODIMENTS

Figure 4:
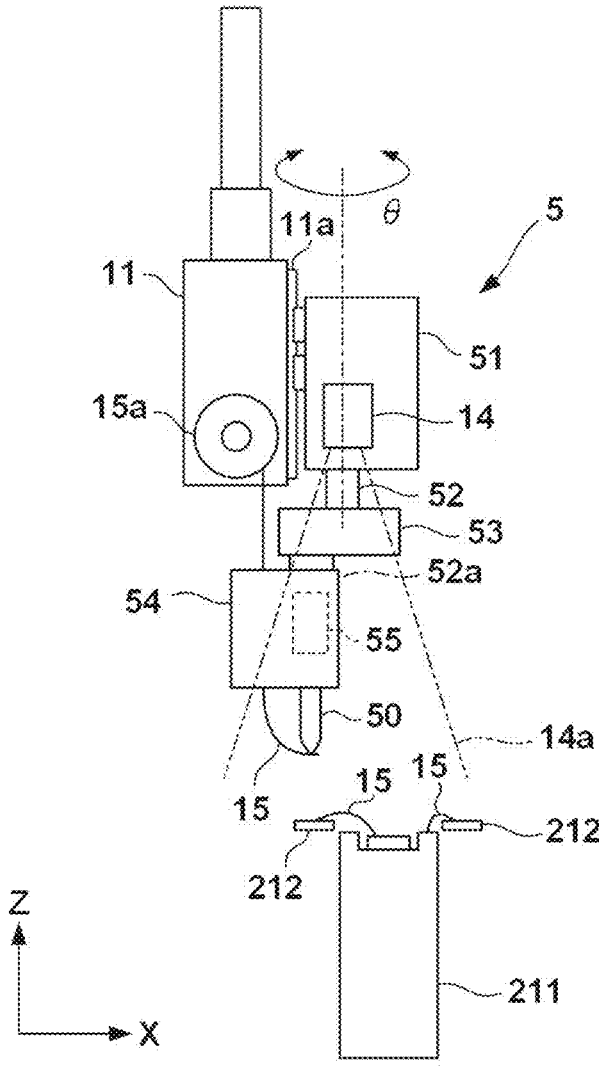
FIG. 4 is a view for explaining a bonding head.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1:
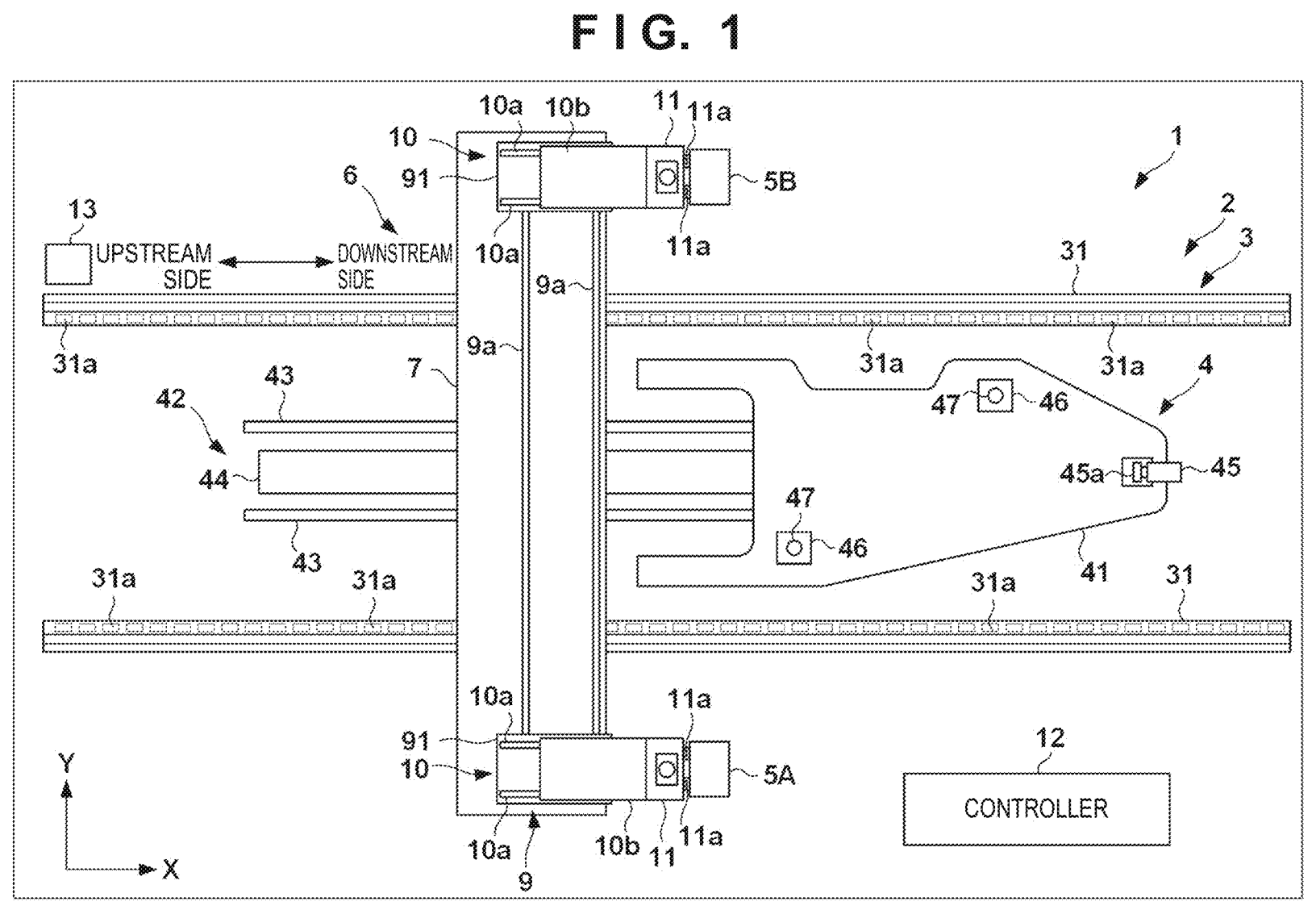
Figure 2:
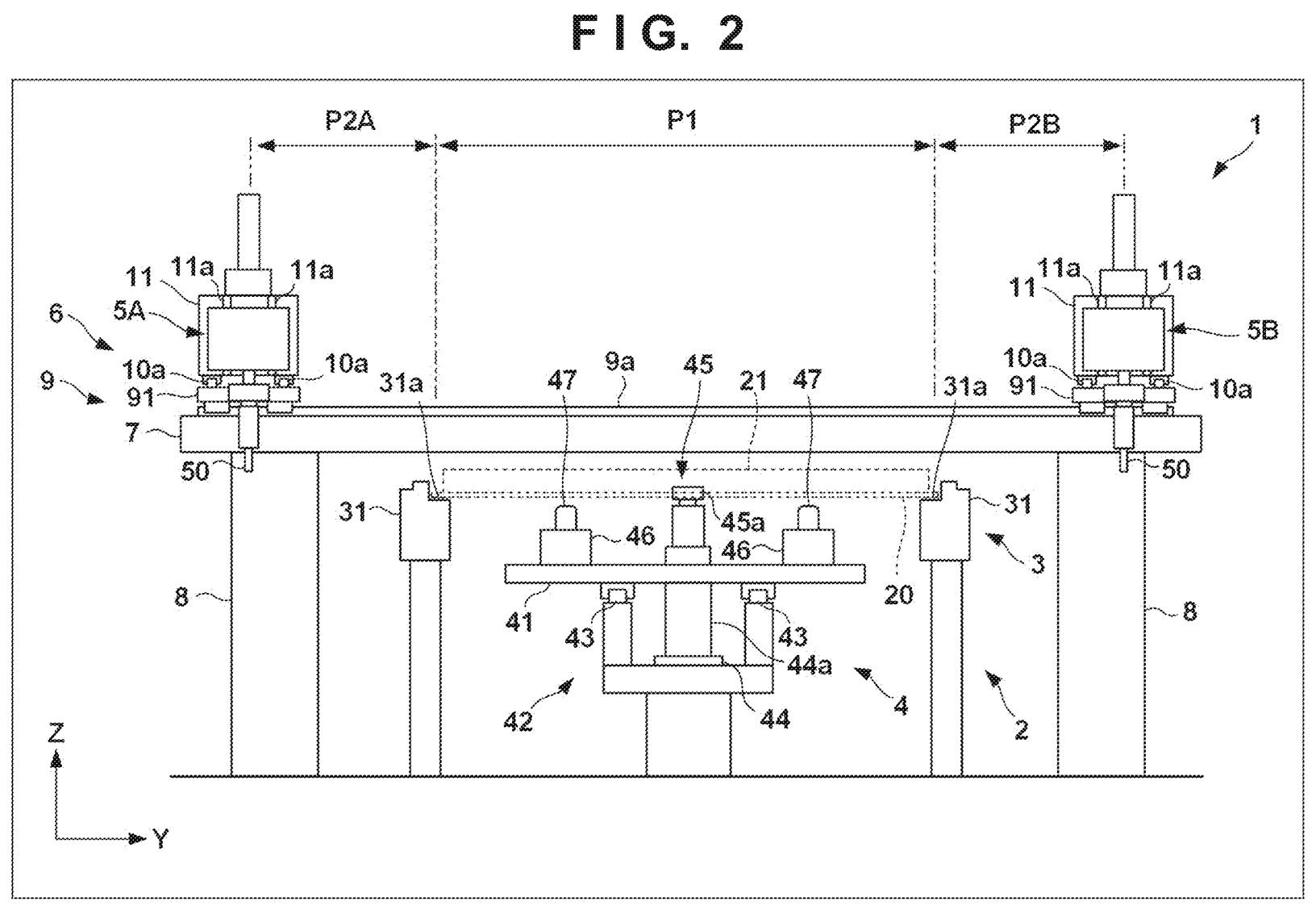
Figure 3:
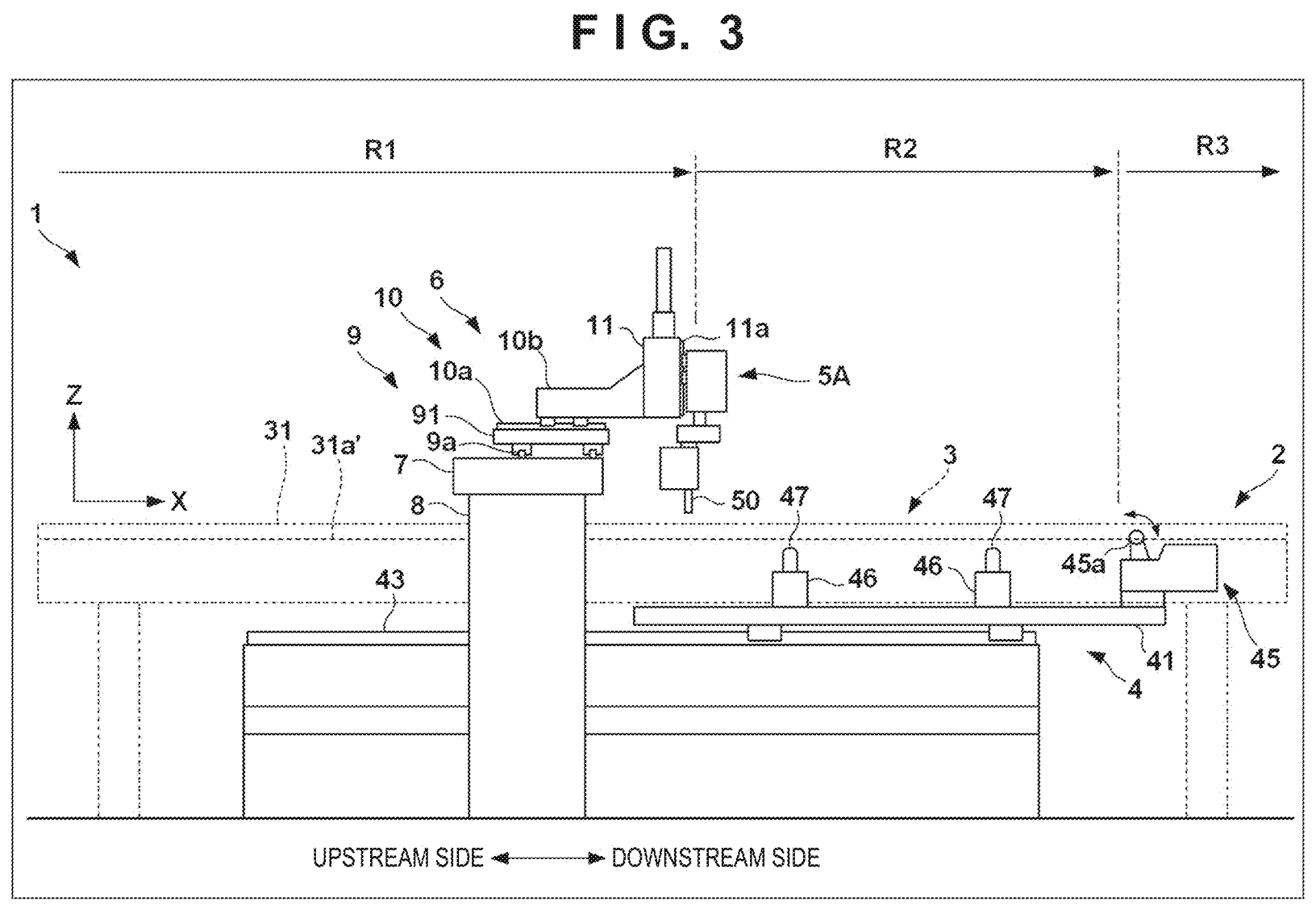

<Arrangement of Apparatus>
FIGS. 1 to 3 are respectively a plan view, a right side view, and a front view of a wire bonding apparatus 1 (to be referred to as the apparatus 1) according to an embodiment of the present invention. Referring to FIGS. 1 to 3, arrows X and Y indicate horizontal directions orthogonal to each other, and an arrow Z indicates a direction perpendicular to an X-Y plane, that is, a vertical direction.

The apparatus 1 includes a conveying device 2, a plurality of bonding heads 5A and 5B (to be referred to as the heads 5A and 5B hereinafter and also be referred to a head 5 when not discriminated from each other or generically referred to), a moving device 6 that moves the head 5, and a controller 12 that controls the apparatus 1.

The conveying device 2 is a device that conveys a work 21 on which a pallet 20 is placed. In this embodiment, the conveying direction is the X direction. In the following description, the terms "upstream side" and "downstream side" respectively mean the upstream side (the lower side in FIG. 1) and the downstream side (the upper side in FIG. 1) in the conveying direction.

The conveying device 2 includes a main conveying device 3 and a sub-conveying device 4. The main conveying device 3 includes a pair of conveyors 31 separated from each other in the Y direction. Each conveyor 31 includes a plurality of rollers 31a that support the pallet 20 from below. The rollers 31a arrayed in the X direction convey the pallet 20 and the work 21 on a conveyance plane 31a' (FIG. 3) defined by the rollers 31a. In this embodiment, the conveyors 31 are roller conveyors. However, other types of conveying mechanisms (belt conveyors and the like) may be used. In addition, the sub-conveying device 4 includes a conveying mechanism with high stop position accuracy such as a slider and a ball screw mechanism.

The main conveying device 3 conveys the pallet 20 and the work 21 in a loading region R1 to a work region R2 and in an unloading region R3 from the work region R2. The loading region R1, the work region R2, and the unloading region R3 in FIG. 3 are illustrated with reference to the position of the leading end of the pallet 20 in the X direction.

In general, in a production system, conveyors are often used for the conveyance of loads. However, the stop position accuracy in conveyance by conveyors is not necessarily high. Therefore, in many cases, a positioning mechanism is required for each work position where a load is stopped and work is performed. The work region R2 is a region where the head 5 performs wire bonding work. In this embodiment, the work region for the pallet 20 and the work 21 is divided into a plurality of regions, and the conveyance of the pallet 20 and the work 21 is stopped for each region to perform wire bonding work. Accordingly, in the embodiment, in the work region R2, the pallet 20 and the work 21 are conveyed in the X direction by the sub-conveying device 4 including a conveying mechanism with high stop position accuracy. This makes it possible to convey the pallet 20 and the work 21 with higher accuracy in the work region R2 without providing any positioning mechanism for each work position. In this case, although the sub-conveying device 4 performs conveyance in the X direction, the main conveying device 3 supports the pallet 20 from below.

In this embodiment, when the sub-conveying device 4 conveys the pallet 20 and the work 21 in the work region R2, drive transfer to each roller 31a is interrupted. The structure of each conveyor 31 includes, for example, a drive source such as a motor and a transfer mechanism that transfers the drive force of the drive source to each roller 31a. The transfer mechanism includes a friction transfer portion that transfers drive force to part of a drive force transfer path. When a predetermined load acts on the roller 31a, drive transfer on the friction transfer portion is interrupted, and no drive force is transferred to the roller 31a.

That is, even while the drive source is driven, the rotation of each roller 31a can be stopped. On the contrary, even while the drive source is not driven, when a predetermined load acts on the roller 31a, the roller 31a can be rotated.

Accordingly, when the sub-conveying device 4 conveys the pallet 20 and the work 21, the sub-conveying device 4 applies a predetermined load to each roller 31a to make the roller 31a rotate accompanying the conveyance of the pallet 20 and the work 21, and hence the roller 31a does not hinder conveyance by the sub-conveying device 4.

When performing conveyance, the sub-conveying device 4 may convey the pallet 20 and work 21 so as to make them slide on the rollers 31a while the rollers 31a stop without rotating. Alternatively, only when the sub-conveying device 4 conveys the pallet 20 and the work 21, the drive source may drive the rollers 31a of the main conveying device 3.

In another arrangement example, the transfer mechanism may include a clutch at part of the drive force transfer path. In this case, while the pallet 20 and the work 21 are conveyed in the work region R2, the drive transfer may be interrupted by the clutch. In this case, the rollers 31a rotate accompanying the conveyance of the pallet 20 and the work 21. This makes it possible to reduce the conveying force with which the sub-conveying device 4 conveys the pallet 20 and the work 21 in the X direction. Even if, therefore, the pallet 20 and the work 21 are heavy, it is possible to employ the sub-conveying device 4 with a compact size.

The sub-conveying device 4 is a device that conveys the pallet 20 and the work 21 by a distance in the X direction in the work region R2. The sub-conveying device 4 includes a table 41 and a moving mechanism 42 that moves the table 41 in the X direction. The moving mechanism 42 includes a pair of guide rails 43 that guide the movement of the table 41 and a drive mechanism 44 that moves the table 41. The pair of guide rails 43 are separated from each other in the Y direction and extend in the X direction. The drive mechanism 44 is coupled to the table 41 through a coupling portion 44a and moves the table 41 back and forth in the X direction. The drive mechanism 44 is, for example, a ball screw mechanism or rack and pinion mechanism.

The table 41 is a plate-like member. A stopper 45, a lifting unit 46, and an engaging portion 47 are provided on the table 41. The stopper 45 includes a swing member 45a that stops the movement of the pallet 20 and the work 21 by abutting against the distal end of the pallet 20. The swing member 45a can swing between the stop position to stop the movement of the pallet 20 and the work 21 and the stop cancel position to allow the passage of the pallet 20 and the work 21. The stopper 45 includes an actuator (not shown) that restricts and cancels the restriction of the swinging of the swing member 45a.

The lifting unit 46 is a unit that moves the engaging portion 47 upward and downward, for example, an electromagnetic solenoid. The engaging portion 47 is a cylindrical pin member extending in the Z direction. The engaging portion 47 is located at a descending position in normal times and at an ascending position at the time of positioning the pallet 20 and the work 21. At the ascending position, the engaging portion 47 is engaged with an engaging hole 201 (FIG. 7) provided in the lower surface of the pallet 20 to position the pallet 20 in the horizontal direction. The engaging hole 201 is a hole having almost the same diameter as that of the engaging portion 47. Inserting the engaging portion 47 into the engaging hole 201 will position the pallet 20 and the work 21 in the horizontal direction. While the engaging portion 47 is engaged with the engaging hole 201, the moving mechanism 42 moves the table 41 in the X direction to convey the pallet 20 and the work 21 in the work region R2.

In this embodiment, when the engaging portion 47 positions the pallet 20 and the work 21 in the horizontal direction, the engaging portion 47 does not lift the pallet 20 and the work 21. That is, when the engaging portion 47 performs positioning, the main conveying device 3 supports the pallet 20 and the work 21 from below. This reduces the force required by the lifting unit 46 to move the engaging portion 47 upward and downward. Accordingly, even if the pallet 20 and the work 21 are heavy, it is possible to employ the lifting unit 46 with a compact size. In addition, since only a small load is applied to the sub-conveying device 4 in the vertical direction, the sub-conveying device 4 need not have high rigidity, and it is possible to employ the sub-conveying device 4 having a compact size and a small weight.

Note that the upstream end portion of the table 41 may be provided with an anti-back mechanism that prevents the backward movement of the pallet 20 and the work 21 conveyed on the table 41. In addition, the table 41 may be provided with a sensor that detects conveyance of the pallet 20 and the work 21 onto the table 41. The sensor is, for example, a reflection type optical sensor, which can be provided near the stopper 45 on the table 41.

The moving device 6 includes a beam member 7 extending in a direction intersecting the X direction so as to cross the conveying device 2 above the conveying device 2. In this embodiment, the beam member 7 extends horizontally in the Y direction. The respective end portions of the beam member 7 in the Y direction are supported by a pair of columnar members 8. The columnar members 8 stand upright on the floor surface of a factory. The beam member 7 and the pair of columnar members 8 are, for example, steel beams.

The moving device 6 includes a moving mechanism 9. The moving mechanism 9 is a mechanism that is supported on the beam member 7 and moves the head 5 in the Y direction. The moving mechanism 9 includes a pair of guide rails 9a provided on the beam member 7 and two sliders 91 that are guided by the pair of guide rails 9a to move in the Y direction. The pair of guide rails 9a are separated from each other in the X direction and extend in the Y direction. The slider 91 is provided for each head 5. In this embodiment, the two sliders 91 move on the common guide rails 9a. However, the guide rails 9a may be provided for each slider 91. For the movement of the sliders 91, the moving mechanism 9 has, for example, a linear motor drive mechanism. However, the moving mechanism 9 may be a ball screw mechanism or rack and pinion mechanism.

The movable zone of the head 5 in the Y direction is almost equal to the length range of the beam member 7 in the Y direction. In this embodiment, the movable zone of the head 5A includes a work zone P1 and a standby zone P2A. The movable zone of the head 5B includes the work zone P1 and a standby zone P2B (FIG. 2). Each zone is based on the position (initial position) of a tool portion 50 of the head 5. The work zone P1 is a zone where the head 5 performs wire bonding work for the work 21 and includes the length of the work 21 in the Y direction. The standby zones P2A and P2B are zones outside the work zone P1 and located on the opposite sides of the conveying device 2 in the Y direction. The standby zone P2A is a zone where the head 5A is located at times other than work times and a position where the head 5A stands by until the start of next work and is subjected to maintenance. Likewise, the standby zone P2B is a zone where the head 5B is located at times other than work times and a position where the head 5B stands by until the start of next work and is subjected to maintenance.

The head 5 is supported on a lifting unit 11 provided for each head 5. The lifting unit 11 includes a pair of rails 11a that are separated from each other in the Y direction and extend in the Z direction and a drive mechanism (not shown) such as a ball screw mechanism. The lifting unit 11 is guided by the pair of rails 11a to move the head 5 in the Z direction.

The moving device 6 includes an advancing/retracting mechanism 10 that causes the head 5 to advance/retract in the X direction through the lifting unit 11. The advancing/retracting mechanism 10 is provided for each head 5 between the moving mechanism 9 and the head 5 and includes a pair of guide rails 10a provided on the slider 91 and a slider 10b that is guided by the pair of guide rails 10a to move in the X direction. The pair of guide rails 10a are separated from each other in the Y direction and extend in the X direction. For the movement of the sliders 10b, the advancing/retracting mechanism 10 has, for example, a linear motor drive mechanism. However, the advancing/retracting mechanism 10 may be a ball screw mechanism or rack and pinion mechanism. The lifting unit 11 is coupled to the end portion of the slider 10b in the X direction. With the above arrangement, the moving device 6 can move each head 5 in each of the X, Y, and Z directions.

A reading device 13 is provided near the loading portion of the conveying device 2. The reading device 13 reads information from the pallet 20 and the work 21. In this embodiment, the pallet 20 and the work 21 are provided with IC tags (202 and 214 in FIG. 5) such as RFID tags. The reading device 13 is a device that reads information from these IC tags. In addition to IC tags, the information of the pallet 20 and the work 21 may be accumulated in the form of barcodes or two-dimensional codes. The reading device 13 is a reading device complying with the accumulation form of information. The reading device 13 may be a reading/writing device having a writing function of writing work completion information or the like in an IC tag.

The controller 12 includes a processor, a storage device such as a semiconductor memory, an input/output interface for each sensor and each actuator constituting the apparatus 1, and a communication interface for a host device (not shown). The storage device stores programs executed by the processor, data used for processing by the processor, and the like. The controller 12 may include a plurality of control units constituted by processors, storage devices, interfaces, and the like. The control unit may be provided for each function of the apparatus 1. For example, the controller 12 may include a control unit that controls the head 5, a control unit that controls the main conveying device 3, a control unit that controls the sub-conveying device 4, and a control unit for overall control.

<Wire Bonding Work>

FIG. 4 is a view for explaining the head 5 and a wire bonding action. The head 5 includes the tool portion 50, a tool drive unit 54, an intermediate member 53, and a turning mechanism 51. The turning mechanism 51 is a mechanism that rotates a shaft 52 and includes, for example, a motor that rotates the shaft 52 around a rotation center axis 52a in the Z direction. The intermediate member 53 is coupled to the lower end portion of the shaft 52. The tool drive unit 54 is coupled to the intermediate member 53 at a position offset from the shaft 52 in the horizontal direction. The tool portion 50 is supported on the tool drive unit 54 and turns around the rotation center axis 52a accompanying the rotation of the shaft 52. This makes it possible to move the tool portion 50 in the θ direction on an X-Y plane.

The two side portions of the turning mechanism 51 in the Y direction are provided with imaging devices 14. Each imaging device 14 includes an optical system such as an image sensing device and a lens and captures an image of an imaging region 14a below the optical system. The controller 12 sets the X and Y coordinates of a work position (a check on the actual joining position of a wire 15 and correction of a control target position) from the information of the work 21 (the basic information of the joining position of the wire 15 as the control target position and the like) read from the reading device 13 and the image of the work 21 captured by the imaging devices 14, thereby enabling wire bonding work.

In wire bonding work, the anode and cathode of a battery cell 211 are connected to corresponding bus bars 212 with the wires 15. FIG. 4 exemplarily shows a cylindrical cell as the battery cell 211. The tool portion 50 includes, for example, an ultrasonic transducer driven by the tool drive unit 54 and a wire cutter. The wire 15 is jointed to the anode, the cathode, or the bus bar 212 by the ultrasonic transducer. After the joining process, the wire 15 is cut by the wire cutter. The wire 15 is supplied from the tool drive unit 54 to the tool portion 50. The wire 15 is wound around a spool 15a. In this embodiment, the spool 15a is replaceably supported on the lifting unit 11.

The head 5 is moved upward and downward by the lifting unit 11 and comes into contact with the work 21. The tool drive unit 54 includes a sensor 55 that detects a load acting on the tool portion 50 in the vertical direction when the distal end of the tool portion 50 comes into contact with the work 21 (the anode, the cathode, or the bus bar 212). The sensor 55 is, for example, a load cell. The controller 12 controls the upward/downward movement of the head 5 by the lifting unit 11, especially the downward movement of the head 5 with respect to the work 21, while monitoring the detection result obtained by the sensor 55.

<Arrangement Example of Work and Work Procedure>

FIG. 5 shows a plan view and a partially enlarged view of the pallet 20 and the work 21 placed on the pallet 20. The pallet 20 is a plate-like member. The work 21 is fixed on the pallet 20 with an engaging structure (not shown). The work 21 includes many battery cells 211 laid in an X-Y plane, a plurality of bus bars 212 arranged so as to cover the battery cells 211, and a case 213 accommodating them. The partially enlarged view exemplarily shows a form after wire bonding work, in which the battery cells 211 are connected to the bus bars 212 with the wires 15.

The work 21 is, for example, an on-board lithium-ion battery, which is, for example, a large battery with lengths of 1,500 mm×1,000 mm in the X and Y directions.

The pallet 20 is provided with an IC tag 202. The work 21 (case 213) is provided with an IC tag 214. The information accumulated in the IC tag 202 includes, for example, the individual information of the pallet 20, the individual information of the work 21 placed on the pallet 20, and the information of the work that has already performed on the work 21. The information accumulated in the IC tag 214 includes, for example, the individual information of the work 21 and work conditions for wire bonding. In this embodiment, both the pallet 20 and the work 21 are provided with the IC tags, and information is accumulated in each tag. However, only one of the pallet 20 and the work 21 may be provided with an IC tag, and information may be accumulated in the tag.

A procedure for wire bonding work for the work 21 will be described. The work area for the work 21 is divided into two regions in the Y direction. The head 5A performs wire bonding work for the YA region. The head 5B performs wire bonding work for the YB region. In addition, the work area for the work 21 is divided into four regions, that is, X1 to X4 regions, in the X direction. The conveyance of the pallet 20 and the work 21 is stopped for each region. The widths of the X1 to X4 regions in the X direction are set to equal or different widths (for example, 150 mm) within the range of the advancing/retracting distance (for example, 160 mm) of the head 5 in the X direction by the advancing/retracting mechanism 10. In the case shown in FIG. 5, the widths of the X1 to X4 regions in the X direction are equal to each other.

In this work, first of all, the pallet 20 and the work 21 are conveyed and stopped at a position where the heads 5A and 5B can perform work for the X1 region. The head 5 moves among joining positions in the X1 region with a combination of movement in the Y direction by the moving mechanism 9, movement in the X direction by the advancing/retracting mechanism 10, and turning in the θ direction by the turning mechanism 51 and performs joining work with the upward/downward movement of the head 5 by the lifting unit 11.

Upon completion of the work for the X1 region, the pallet 20 and the work 21 are conveyed and stopped at a position where the heads 5A and 5B can perform work for the X2 region. The head 5 moves among joining positions in the X2 region with a combination of movement in the Y direction by the moving mechanism 9 and movement in the X direction by the advancing/retracting mechanism 10 and performs joining work with the upward/downward movement of the head 5 by the lifting unit 11. Subsequently, similar operations are performed for the X3 region and the X4 region, and the wire bonding work for the overall work 21 is completed.

<Example of Control>

Figure 6:
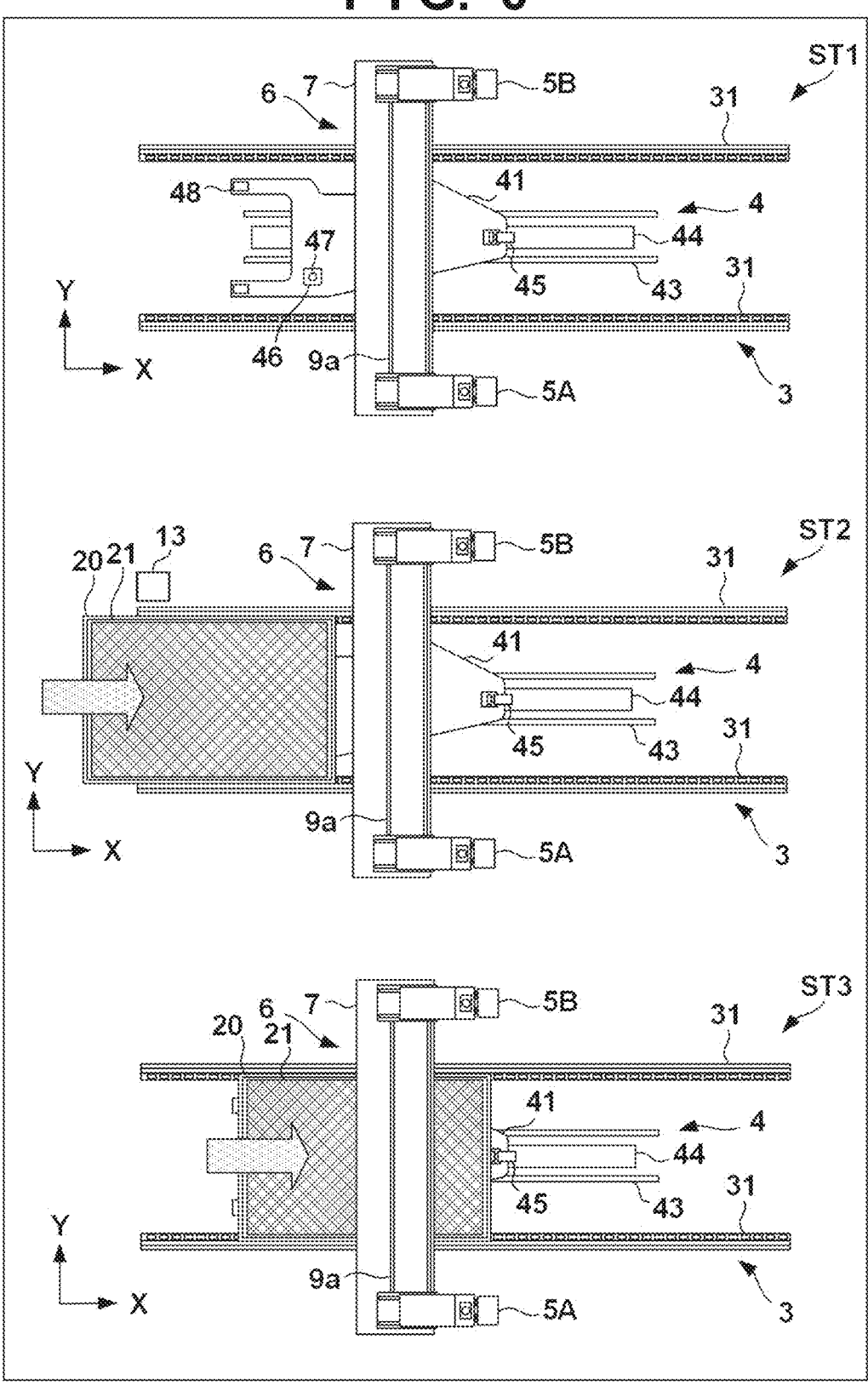
FIG. 6 is a view for explaining the operation of the wire bonding apparatus in FIG. 1.

An example of control of the apparatus 1 by the controller 12 will be described with reference to FIGS. 6 to 10. FIGS. 6 to 10 are views for explaining the operation of the apparatus 1 concerning wire bonding work for the work 21. A state ST1 in FIG. 6 shows an initial state in standby for loading of the pallet 20 and the work 21 (both are sometimes simply referred to as the work 21 in the following description of an example of control). The table 41 is located at the most upstream position as its initial position. The swing member 45a of the stopper 45 is located at a stop position, and the engaging portion 47 is located at a descending position. The head 5A and the head 5B are respectively located in the standby zone P2A (FIG. 2) and the standby zone P2B.

A state ST2 in FIG. 6 indicates a state in which another conveying equipment or worker has loaded the work 21 into the conveying device 3. In the process of loading, the reading device 13 reads information from the IC tag 202 of the pallet 20 and the IC tag 214 of the work 21. The controller 12 acquires the read information and sets subsequent control details. For example, the reading device 13 specifies the joining positions and types of wire bonding from the individual information of the work 21 and performs corresponding control. In addition, the controller 12 can perform control, based on the information of the work already done, whether to perform wire bonding work in the apparatus 1 or unload the work without performing any work.

A state ST3 in FIG. 6 indicates a state in which the main conveying device 3 has conveyed the work 21 to the downstream side, and the stopper 45 has stopped the conveyance. When the stopper 45 stops the work 21 on the table 41, as indicated by a state ST4 in FIG. 7, the lifting unit 46 moves the engaging portion 47 upward to engage it with the engaging hole 201 of the pallet 20. This completes the positioning of the pallet 20 and the work 21 in the horizontal direction.

The work 21 has stopped at a position where the head 5 can perform wire bonding work for the X1 region (FIG. 5) and wire bonding work is started. First of all, as indicated by a state ST5 in FIG. 7, the heads 5A and 5B are moved to above the first joining position in the work zone P1 (FIG. 2). At the time of this movement, the imaging device 14 captures an image of the upper surface of the work 21, and the joining position and the tool portion 50 are aligned with each other based on the information read from the IC tag and the captured image. The head 5A is located at an end portion of the work 21 in the Y direction, and the head 5B is located at a middle portion of the work 21 in the Y direction. In aligning the joining position with the tool portion 50, the advancing/retracting mechanism 10 and the moving mechanism 9 perform positioning control of the tool portion 50 in the X and Y directions. In addition, the turning mechanism 51 can control the orientation of the tool portion 50 (the direction in which the wire is drawn around).

Figure 7:
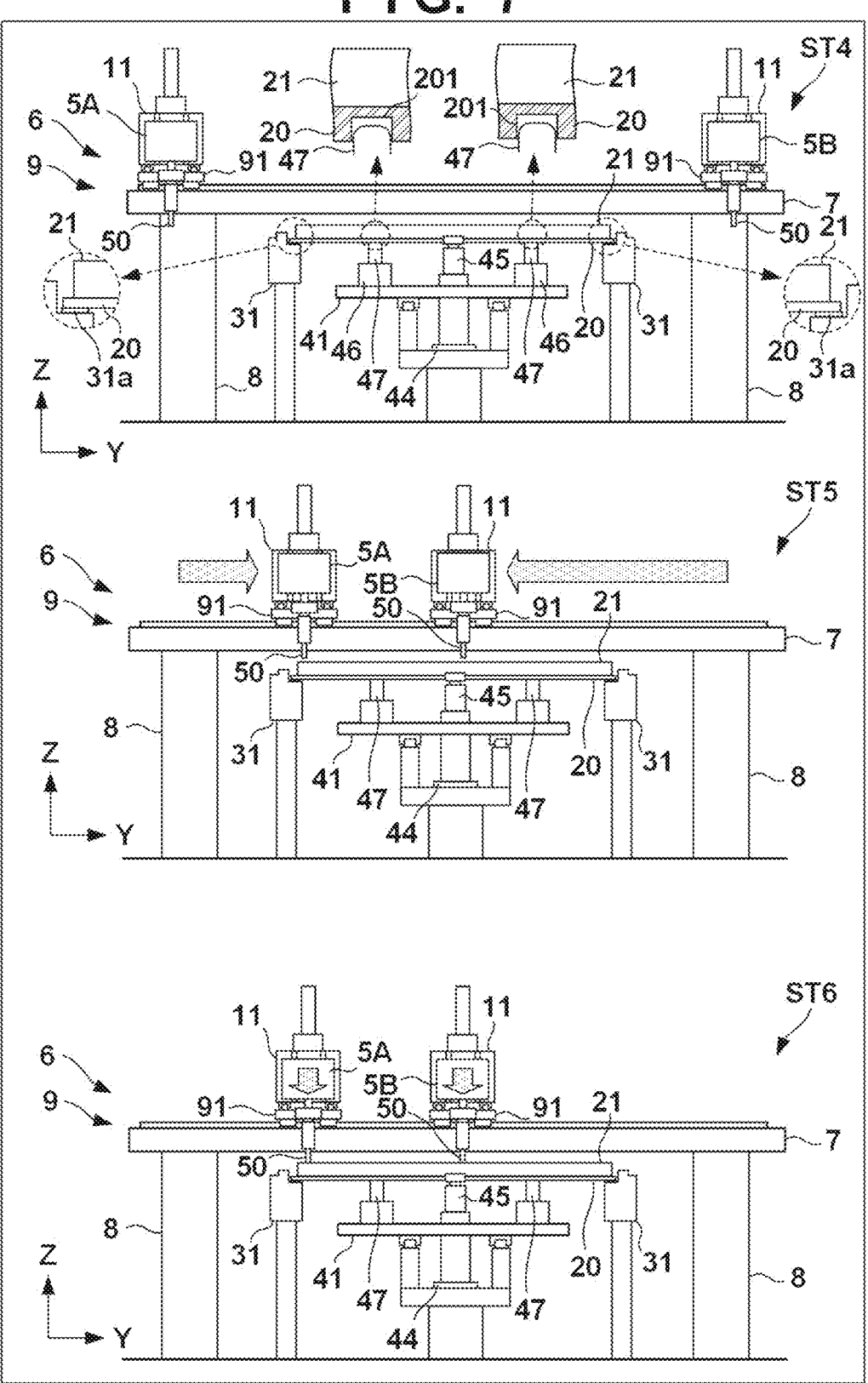
FIG. 7 is a view for explaining the operation of the wire bonding apparatus in FIG. 1.
Figure 9:
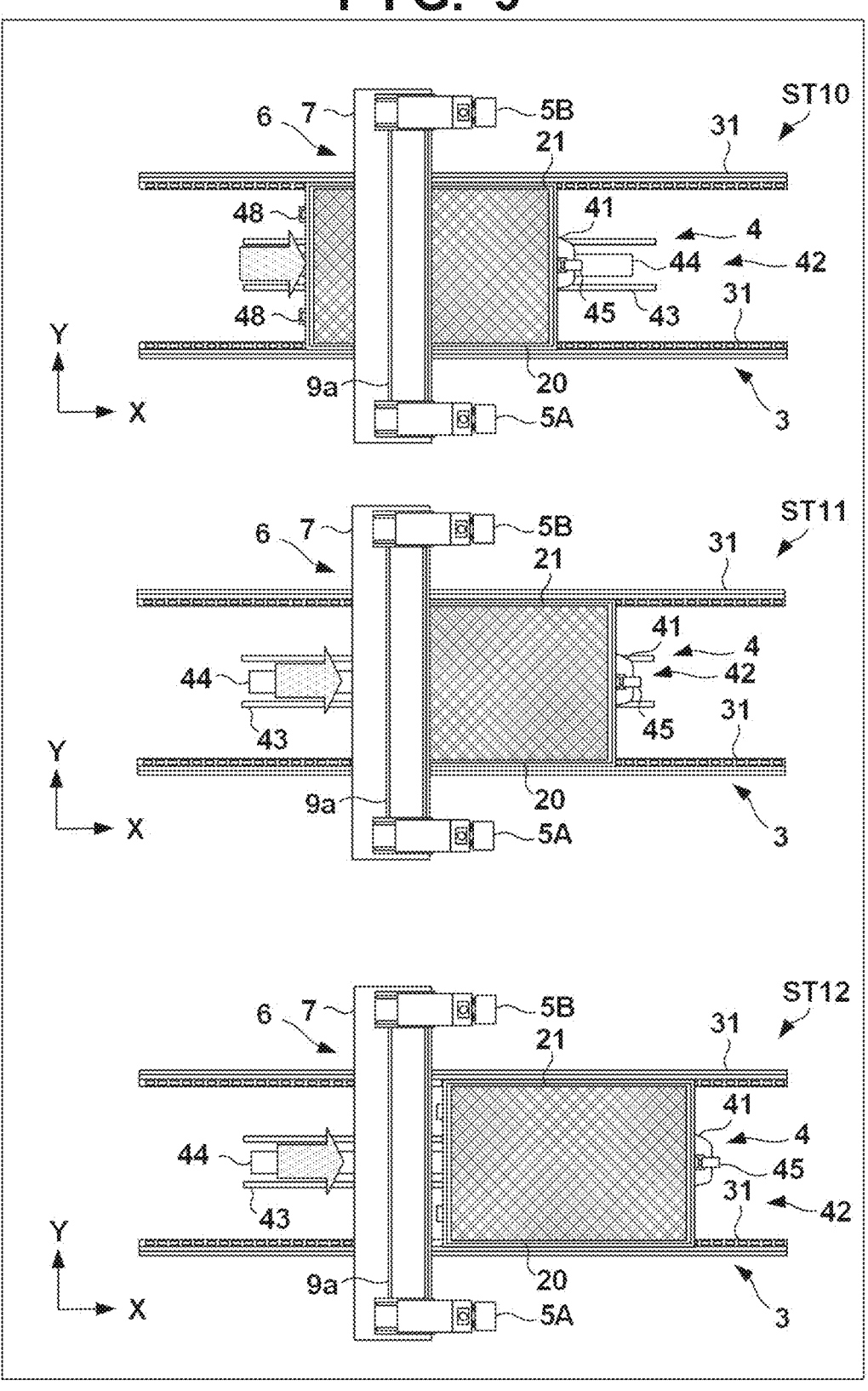
FIG. 9 is a view for explaining the operation of the wire bonding apparatus in FIG. 1.

As indicated by a state ST6 in FIG. 7, the lifting unit 11 moves the heads 5A and 5B downward, and joining work is performed. At this time, the sensor detects a load acting on the tool portion 50 in the vertical direction, and the amount of downward movement of the head 5 is controlled.

Upon completion of wire bonding work at one joining position, the head is moved to another joining position. At the time of this movement, the imaging devices 14 captures an image of the upper surface of the work 21, and the joining position and the tool portion 50 are aligned with each other based on the information read from the IC tags 202 and 214 and the captured image. The heads 5A and 5B are independently moved within a range in which they do not interfere with each other. FIG. 8 shows an example of performing wire bonding work while synchronously moving the heads 5A and 5B almost in the Y direction. That is, as indicated by a state ST7, the heads 5A and 5B move in one direction in the Y direction toward the respective joining positions, and as indicated by a state ST8, the head 5A reaches the middle portion of the work 21 in the Y direction, and the head 5B reaches the end portion of the work 21 in the Y direction. Then, as indicated by a state ST9 in FIG. 8, the heads 5A and 5B are moved in opposite directions in the Y direction.

Upon completion of wire bonding work at all the joining positions in the X1 region of the work 21, the process shifts to wire bonding work for the X2 region of the work 21. Accordingly, as indicated by a state ST10 in FIG. 9, the moving mechanism 42 moves the table 41 to the downstream side to convey the work 21 to the downstream side and stop it. With a procedure similar to that indicated by the state ST5 in FIG. 7 to the state ST9 in FIG. 8, wire bonding work is performed for the X2 region of the work 21.

Upon completion of wire bonding work at all the joining positions in the X2 region of the work 21, the process shifts to wire bonding work for the X3 region of the work 21. Accordingly, as indicated by a state ST11 in FIG. 9, the moving mechanism 42 moves the table 41 to the downstream side to convey the work 21 to the downstream side and stop it. With a procedure similar to that indicated by the state ST5 in FIG. 7 to the state ST9 in FIG. 8, wire bonding work is performed for the X3 region of the work 21.

Upon completion of wire bonding work at all the joining positions in the X3 region of the work 21, the process shifts to wire bonding work for the X4 region of the work 21. Accordingly, as indicated by a state ST12 in FIG. 9, the moving mechanism 42 moves the table 41 to the downstream side to convey the work 21 to the downstream side and stop it. With a procedure similar to that indicated by the state ST5 in FIG. 7 to the state ST9 in FIG. 8, wire bonding work is performed for the X4 region of the work 21.

Upon completion of wire bonding work at all the joining positions in the X4 region of the work 21, the work 21 is unloaded. Accordingly, as indicated by a state ST13 in FIG. 10, the lifting unit 46 moves the engaging portion 47 downward to disengage the engaging portion 47 from the engaging hole 201 of the pallet 20. In addition, the swing member 45a of the stopper 45 is moved to a stop cancel position. Then, as indicated by a state ST14 in FIG. 10, the main conveying device 3 unloads the work 21 to the unload region R3 (FIG. 3). A writing device may be placed adjacent to the unload region R3 to write, on the IC tag 202, information indicating the completion of the work in the apparatus 1 in the process of unloading.

A series of work is completed in the above manner. In this embodiment, since the head 5 is supported by the gate-shaped structure (the beam member 7 and the pair of columnar members 8), the support rigidity is high. This makes it possible to obtain high position accuracy while increasing the work area for the head 5. The conveying device 2 includes the main conveying device 3 and the sub-conveying device 4, and the sub-conveying device 4 is used to switch among the X1 to X4 regions requiring relatively high movement accuracy. On the other hand, since the pallet 20 and the work 21 are always supported by the main conveying device 3 from below, even if the work 21 is heavy, stable supporting can be achieved. Since the heads 5A and 5B independently move and perform wire bonding work, the work efficiency can be increased.

<Control in Abnormal Situation>

Figure 11:
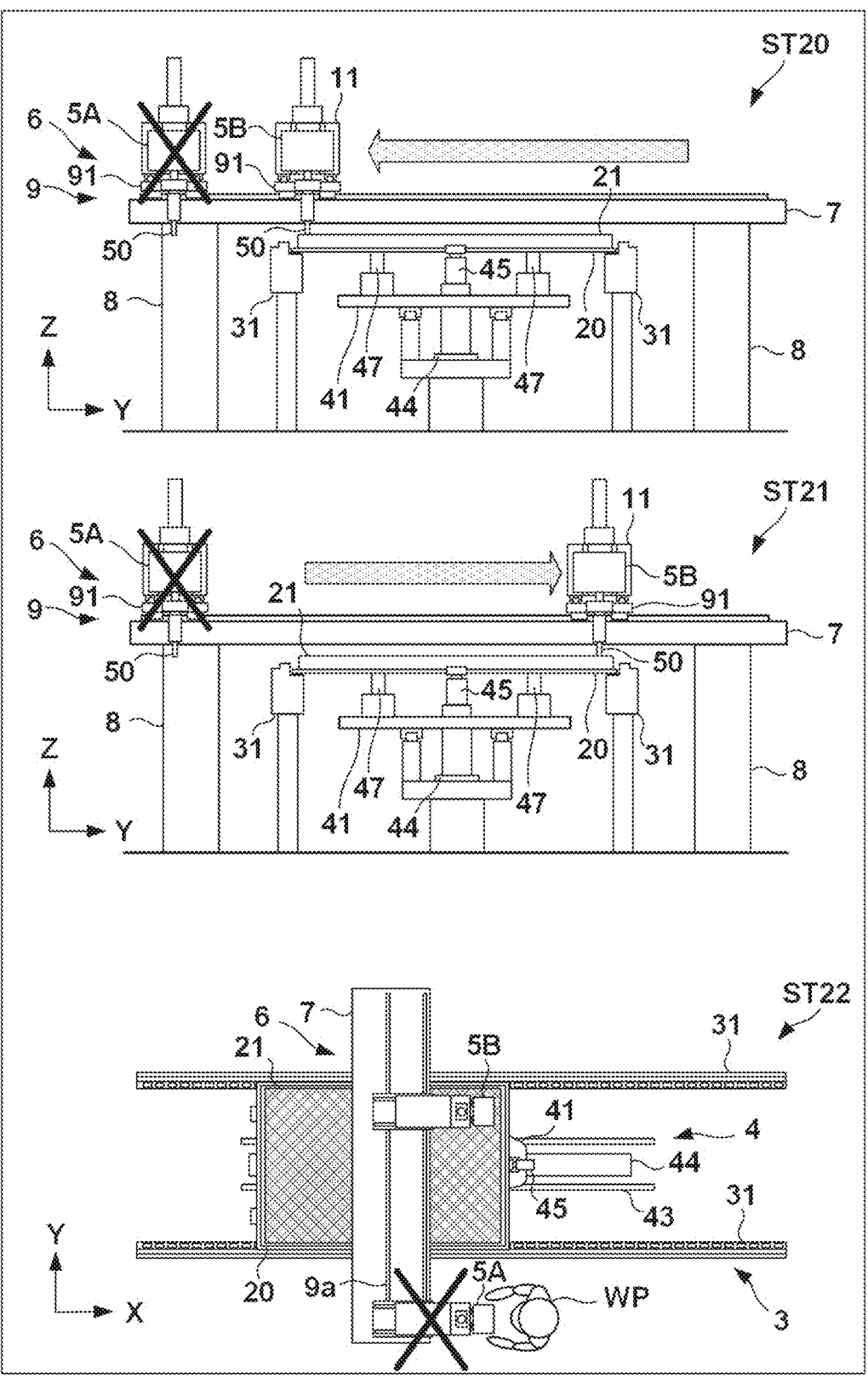
FIG. 11 is a view for explaining the operation of the wire bonding apparatus in FIG. 1.

The apparatus 1 according to this embodiment includes the two heads 5A and 5B. Accordingly, even if one of the heads undergoes abnormality or requires maintenance, the other head can continue work. FIG. 11 is a view showing an example of such control.

The example shown in FIG. 11 shows a case in which the head 5A cannot be used. States ST20 and ST21 show an example in which the head 5A is located in the standby zone P2A, and wire bonding work is performed using the head 5B. In normal times, as exemplarily shown in FIG. 5, the heads 5A and 5B respectively perform wire bonding work for the YA region and the YB region. When the head 5A cannot be used, the head 5B performs wire bonding work for both the YA region and the YB region. This makes it possible to continue wire bonding work for the work 21 without interrupting the work even if abnormality occurs in the head 5A in the middle of the work.

The head 5A in the standby zone P2A is located outside the conveying device 2 in the Y direction. Accordingly, as exemplarily indicated by a state ST22 in FIG. 11, a worker WP can perform maintenance work for the head 5A without interrupting wire bonding work for the work 21. In this embodiment, the head 5 is located at a position (a position on the downstream side) shifted from the beam member 7 in the X direction. This provides the worker WP with high accessibility to the head 5A and enables the worker WP to smoothly perform maintenance work.

Second Embodiment

Figure 12:
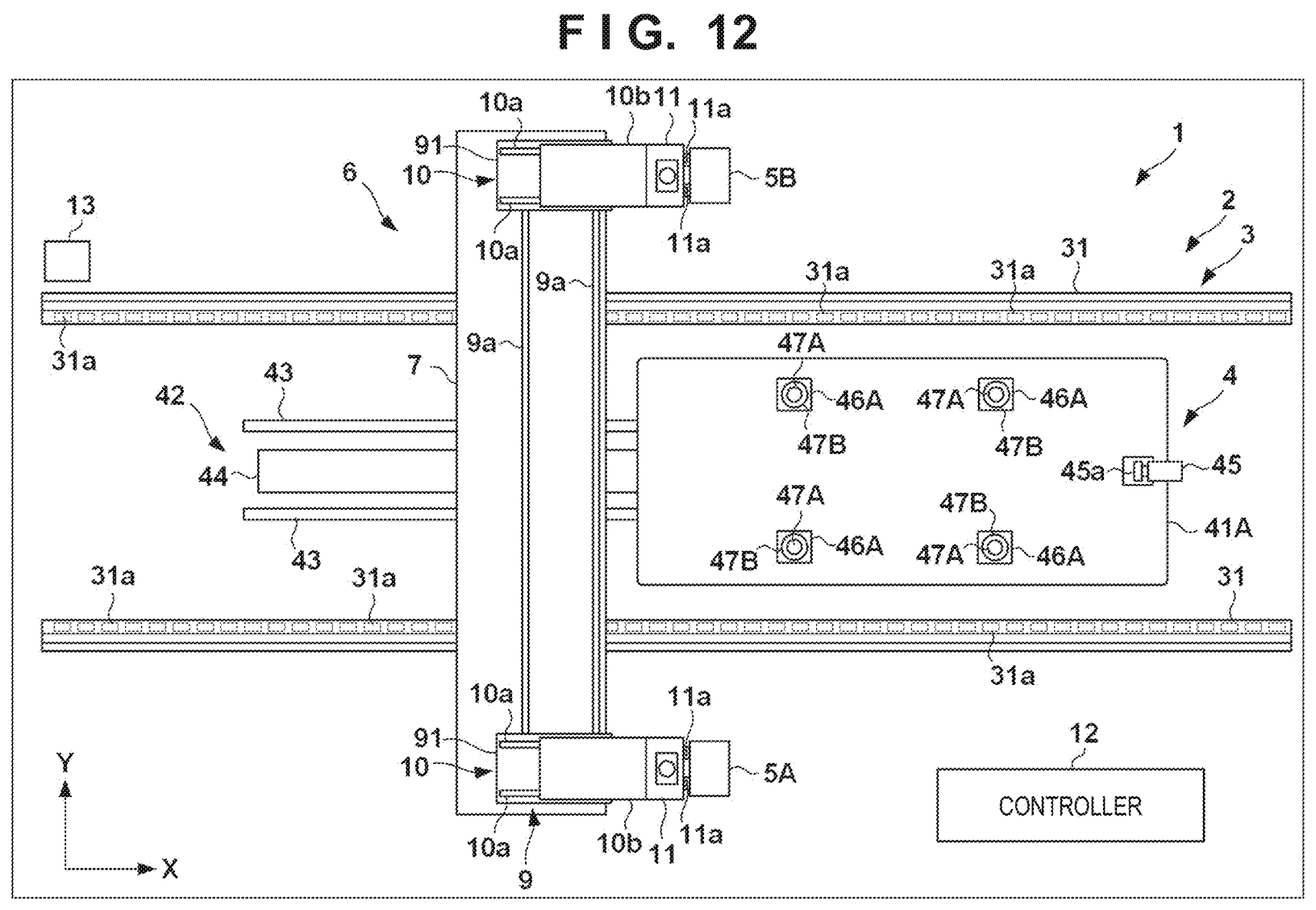
Figure 13:
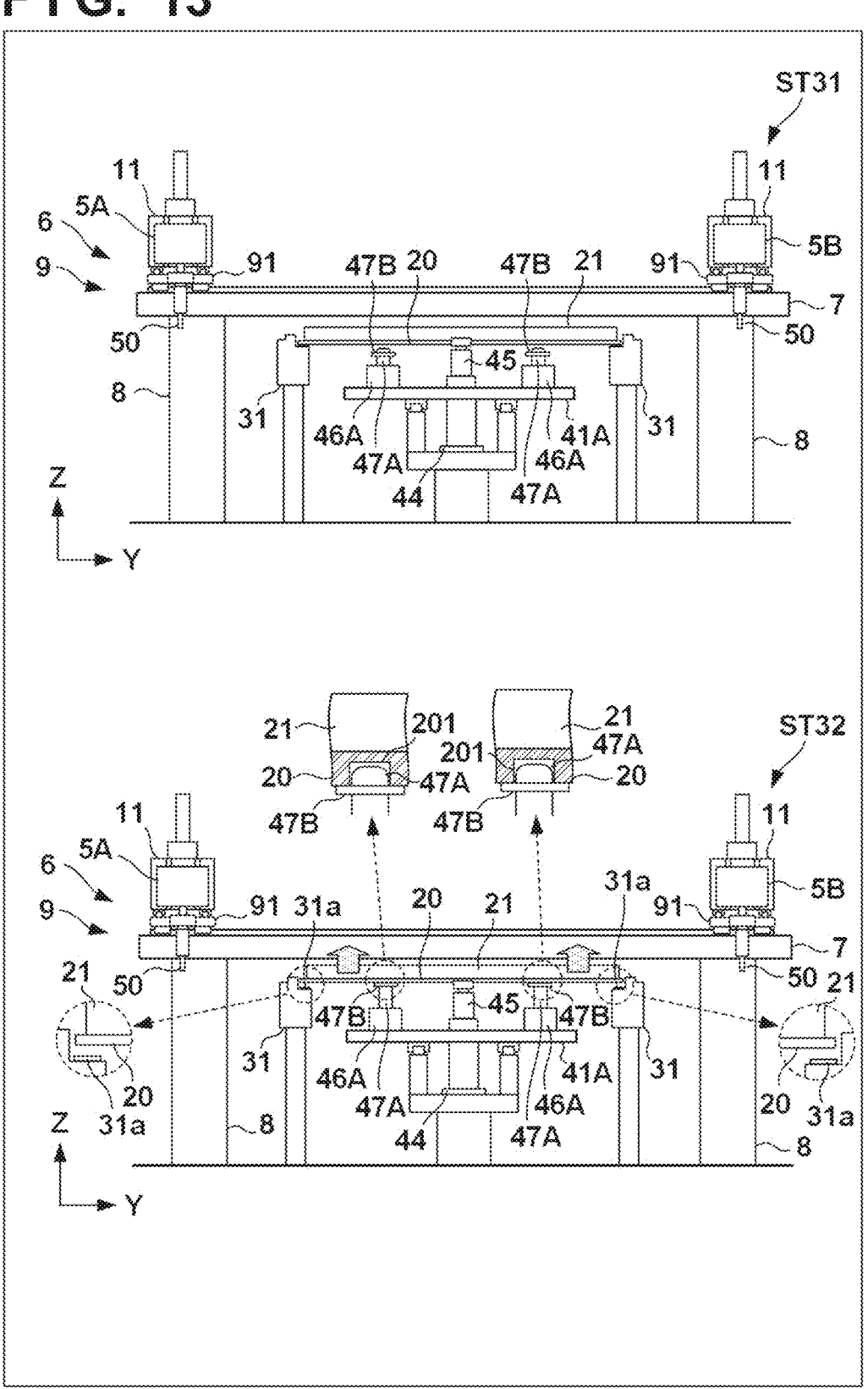
FIG. 13 is a view for explaining the operation of the wire bonding apparatus in FIG. 12.

In the first embodiment, even when the sub-conveying device 4 conveys the pallet 20 and the work 21, the pallet 20 is supported on the main conveying device 3. However, while the pallet 20 is separated upward from the main conveying device 3, the sub-conveying device 4 may convey the pallet 20 and the work 21. FIGS. 12 and 13 are views showing an example of such case.

In the example shown in FIGS. 12 and 13, a table 41A replacing the table 41 is provided with four lifting units 46A replacing the lifting unit 46. The lifting units 46A are, for example, fluid cylinders or electric cylinders. Each lifting unit 46A moves an engaging portion 47A replacing the engaging portion 47 upward and downward. The engaging portion 47A includes a flange portion 47B at a midway portion of a cylindrical pin member extending in the Z direction. The engaging portion 47A is located at a descending position in normal times and at an ascending position at the time of conveying a pallet 20 and a work 21.

FIG. 13 is a view for explaining the operation of an apparatus 1 according to this embodiment. A state ST31 is a state corresponding to the state ST4 in FIG. 7 and is a state in which the pallet 20 and the work 21 are stopped by a stopper 45. Subsequently, as indicated by a state ST32 in FIG. 13, the lifting units 46A moves the engaging portion 47A upward to engage the engaging portion 47A with an engaging hole 201 of the pallet 20. This completes the positioning of the pallet 20 and the work 21 in the horizontal direction. The engaging portion 47A is further moved upward, and the flange portion 47B lifts the pallet 20 and the work 21 while coming into contact with the bottom surface of the pallet 20, thus separating the pallet 20 from rollers 31a. In this state, the sub-conveying device 4 conveys the pallet 20 and the work 21.

Third Embodiment

Figure 14:
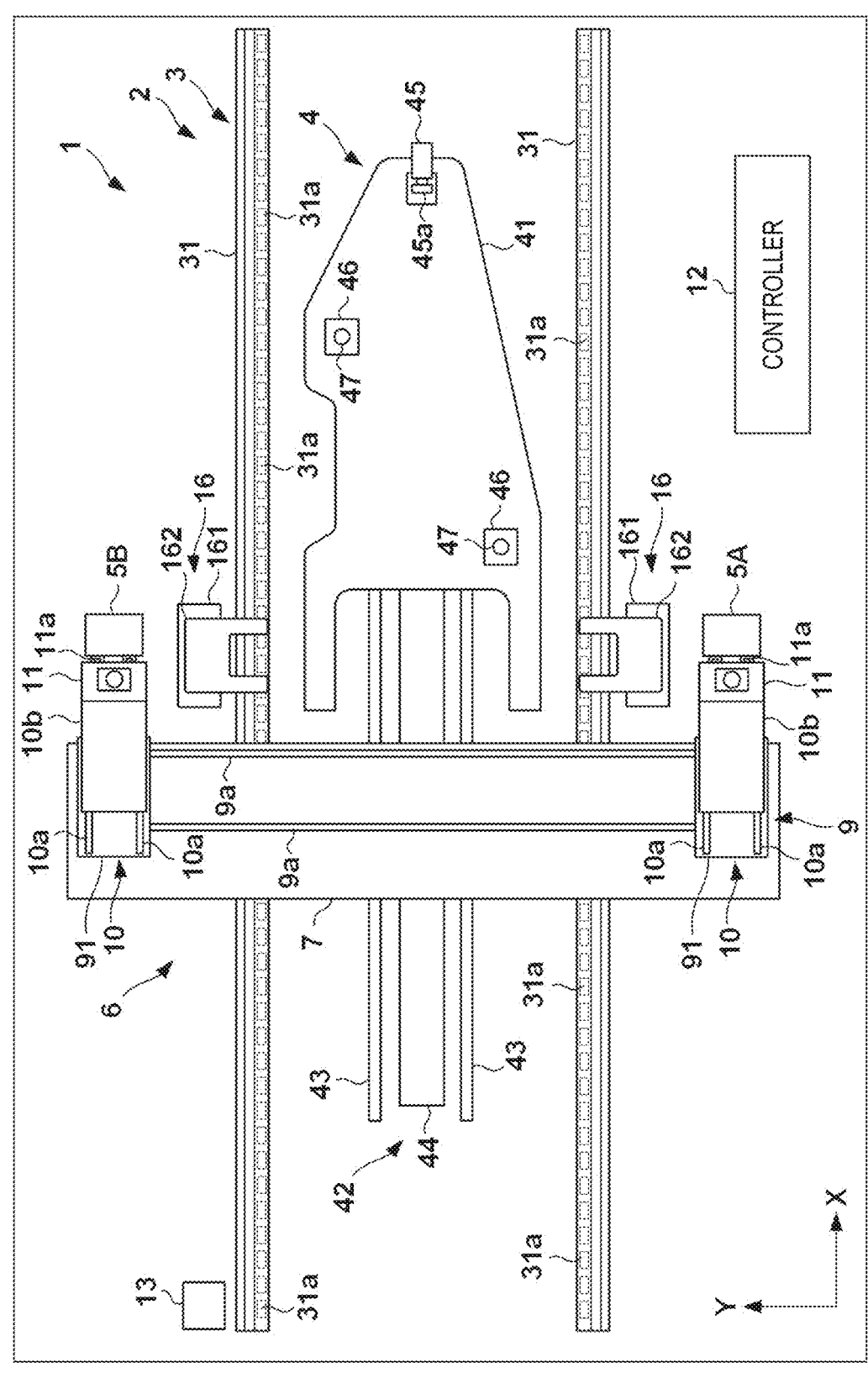
FIG. 14 is a view for explaining the operation of the wire bonding apparatus provided with a restriction unit.

In order to prevent a pallet 20 and a work 21 from floating, a floating restriction mechanism for preventing the pallet 20 and the work 21 from floating may be provided. FIGS. 14 and 15 are views showing an example of such case.

In the example shown in FIGS. 14 and 15, both sides of a conveying device 2 in the Y direction are respectively provided with restriction units 16. Each restriction unit 16 includes an abutment member 162 and a lifting unit 161 that moves the abutment member 162 upward and downward. The abutment member 162 is a U-shaped plate-like member, which is placed in a work region R2 (FIG. 3) so as to come into contact with the work 21 from above. In this embodiment, the abutment member 162 comes into contact with a case 213 of the work 21. However, the abutment member 162 may be configured to come into contact with the pallet 20 or may be configured to come into contact with both the pallet 20 and the work 21. The lifting unit 161 is, for example, an electromagnetic solenoid, fluid cylinder, or electric cylinder.

The lifting unit 161 is controlled to separate the abutment member 162 from the work 21 at the time of conveying the work 21 and to bring the abutment member 162 into contact with the work 21 from above at the time of stopping the conveyance of the work 21. FIG. 15 shows an example of such control. In a state ST41, the work 21 is conveyed, and the abutment member 162 is located at an ascending position and separated from the work 21. In a state ST42, the conveyance of the work 21 is stopped, and the abutment member 162 is located at a descending position and in contact with the work 21 from above to restrict floating of the work 21. Making the head 5 perform wire bonding work in this state can improve the work accuracy.

Figure 16:
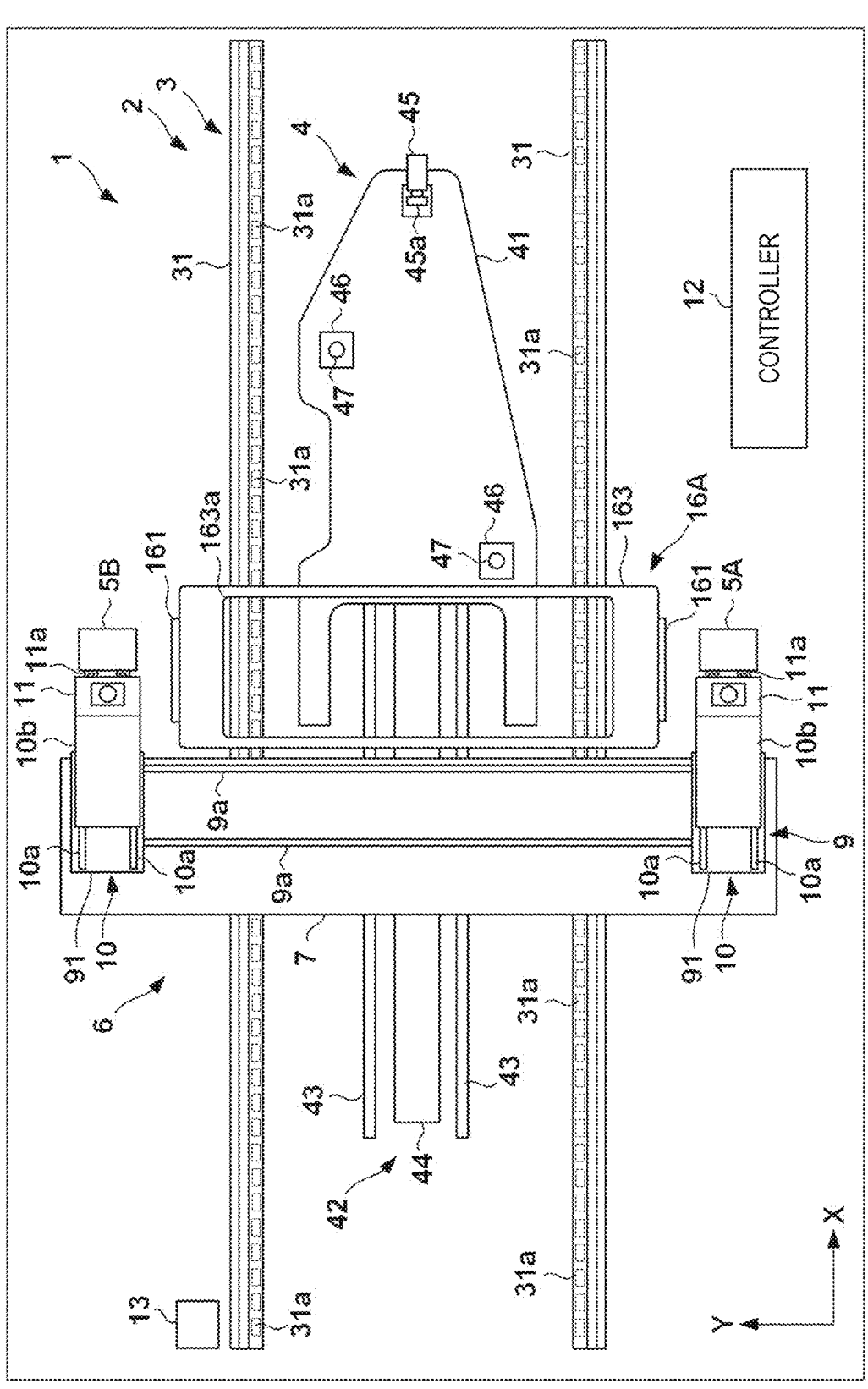
FIG. 16 is a view for explaining another example of an abutment member.

FIG. 16 shows a modification of the restriction unit 16A. The restriction unit 16A is provided with one abutment member 163 replacing the abutment member 162. The two lifting units 161 move the abutment member 163 upward and downward. The abutment member 163 is a plate-like member extending in the Y direction so as to cross the conveying device 2. Each lifting unit 161 is placed outside the conveying device 2 in the Y direction. When the abutment member 163 is moved downward, the abutment member 163 comes into contact with the upper surface of the work 21 to prevent it from floating. The abutment member 163 is provided with an opening portion 163a. The head 5 performs wire bonding work for the work 21 through the opening portion 163a.

FIG. 17 shows another arrangement example for the prevention of floating of the work 21. In the example shown in FIG. 17, the pallet 20 is provided with a plurality of abutment members 203 that come into contact with the work 21 from above the work 21. The abutment member 203 includes a shaft portion 203a standing upright on the pallet 20 and an abutment portion 203b extending in the horizontal direction. The abutment members 203 are attached to the pallet 20 so as to be pivotal about centers 203c of the shaft portions 203a. Floating of the work 21 can be prevented by making the abutment members 203 pivot such that the abutment portions 203b are located above the work 21. FIG. 17 shows a state in which all the abutment portions 203b are located above the work 21. Making the abutment members 203 pivot so as to locate the abutment portions 203b outside the work 21 can separate the work 21 from the pallet 20. Like the arrangement examples in FIGS. 14 to 16, the arrangement example in FIG. 17 does not require the operation of moving the abutment members (162, 163) upward and downward. This can shorten the work time.

Fourth Embodiment

Figure 18:
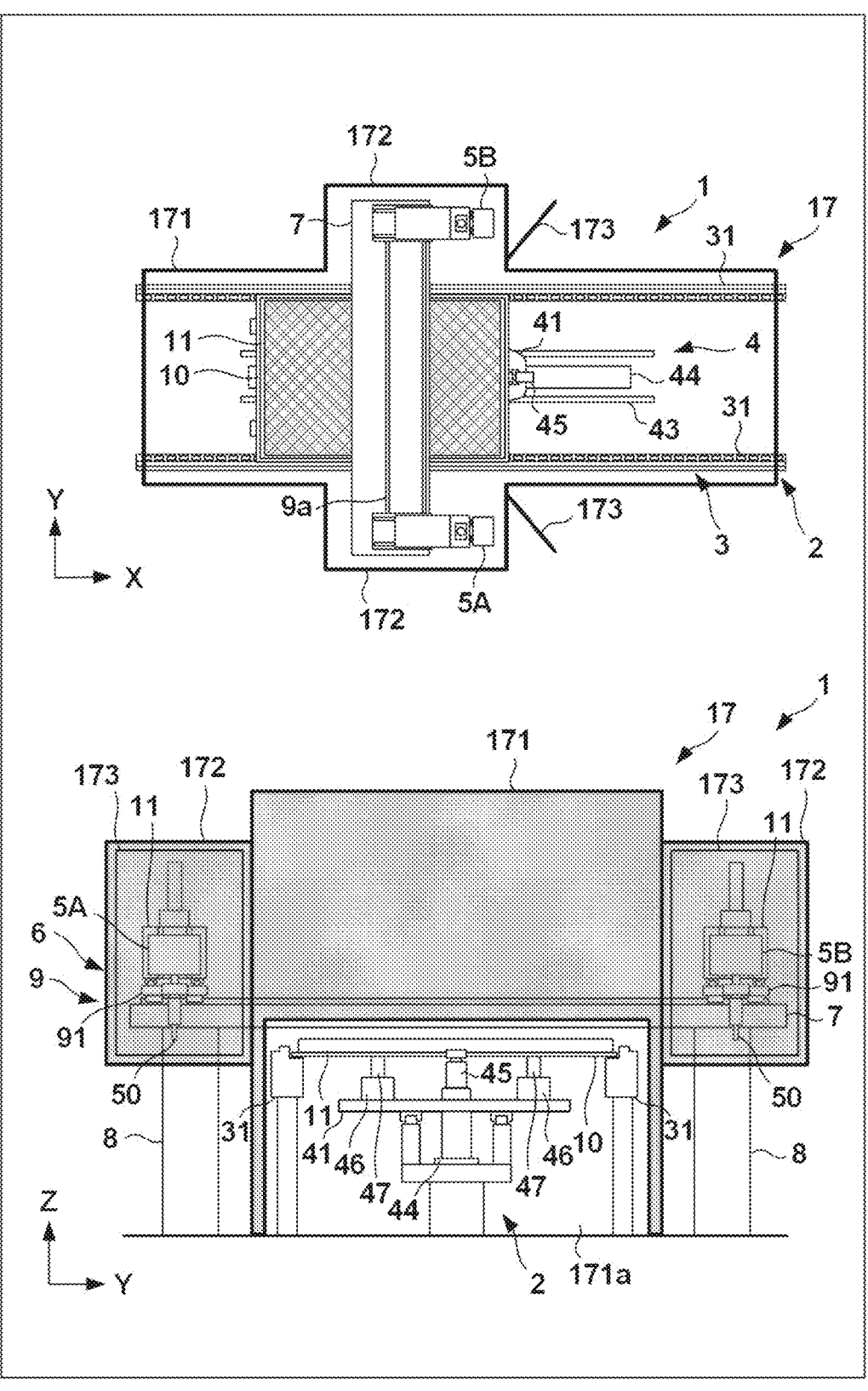
FIG. 18 shows a plan view and a right side view of the wire bonding apparatus in FIG. 1 which is provided with a safety fence.

A safety fence may be provided around an apparatus 1. FIG. 18 shows a plan view and a right side surface of the apparatus 1 provided with a safety fence 17. The safety fence 17 includes an enclosure 171 surrounding a conveying device 2 and an enclosure 172 surrounding an end portion of a beam member 7 in the Y direction and has a cylindrical shape, as a whole, with upper and lower openings. The safety fence 17 includes, for example, a wall body such as a resin plate having transparency and a frame body that supports the wall body. The both end portions of the enclosure 171 in the X direction are respectively provided with openings 171a for loading and unloading of a pallet 20 and a work 21. A part of the enclosure 172 has an openable door 173. Opening the door 173 as shown in the plan view allows the worker to access a head 5A and a head 5B respectively located in standby zones P2A and P2B (FIG. 2). This allows the worker to perform maintenance work for the head 5.

Fifth Embodiment

Figure 19:
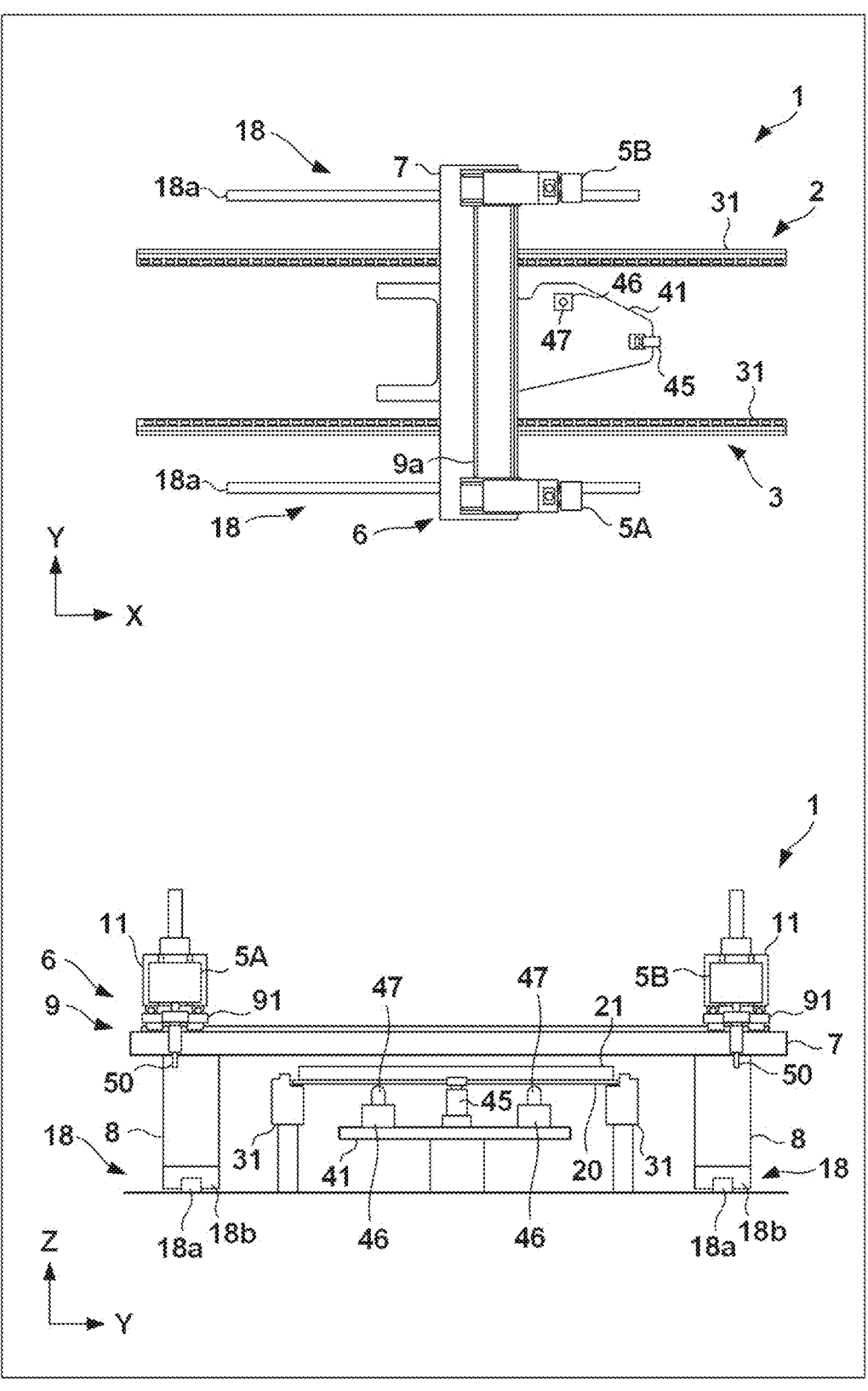
FIG. 19 shows a plan view and a right side view of a wire bonding apparatus according to another embodiment.

Another arrangement example of a moving device 6 will be described. FIG. 19 shows a plan view and a right side view of an apparatus 1 showing an example of such arrangement. The apparatus 1 in FIG. 19 includes a moving mechanism 18 that moves a gate-shaped structure (the beam member 7 and the pair of columnar members 8) in the X direction. The moving mechanism 18 includes a pair of guide rails 18*a* that are separated from each other in the Y direction and extend in the X direction and a pair of sliders 18*b* that are guided by the pair of guide rails 18*a* to move in the X direction. For the movement of the sliders 18*b*, the moving mechanism 18 has, for example, a linear motor drive mechanism. The moving mechanism 18 is, for example, a ball screw mechanism or rack and pinion mechanism.

A pair of columnar members 8 are mounted on the pair of sliders 18*b*. As the pair of sliders 18*b* move in the X direction, the gate-shaped structure (the beam member 7 and the pair of columnar members 8) moves in the X direction. In this embodiment, making the gate-shaped structure (the beam member 7 and the pair of columnar members 8) according to this embodiment move will switch among the X1 to X4 regions (FIG. 5). Accordingly, the apparatus 1 does not include a sub-conveying device 4 as a conveying mechanism for a work 21 but includes a table 41 whose position is fixed and components (a stopper 45, an engaging portion 47, and a lifting unit 46) mounted on the table 41.

The apparatus 1 operates as follows. For example, after the pallet 20 and the work 21 are stopped by the stopper 45, the gate-shaped structure (the beam member 7 and the pair of columnar members 8) is moved to a position where a head 5 can perform work for the X1 region. Upon completion of wire bonding work for the X1 region, the gate-shaped structure (the beam member 7 and the pair of columnar members 8) is moved to a position where the head 5 can perform work for the X2 region. Subsequently, in a similar manner, wire bonding work is performed for the X3 region and the X4 region.

In the embodiment shown in FIG. 19, as in the first embodiment, the standby zones (P2A and P2B in FIG. 2) for the heads 5A and 5B are located outside the conveying device 2 in the Y direction. This provides the worker with high accessibility to the head 5 and enables the worker to smoothly perform maintenance work.

Figure 20:
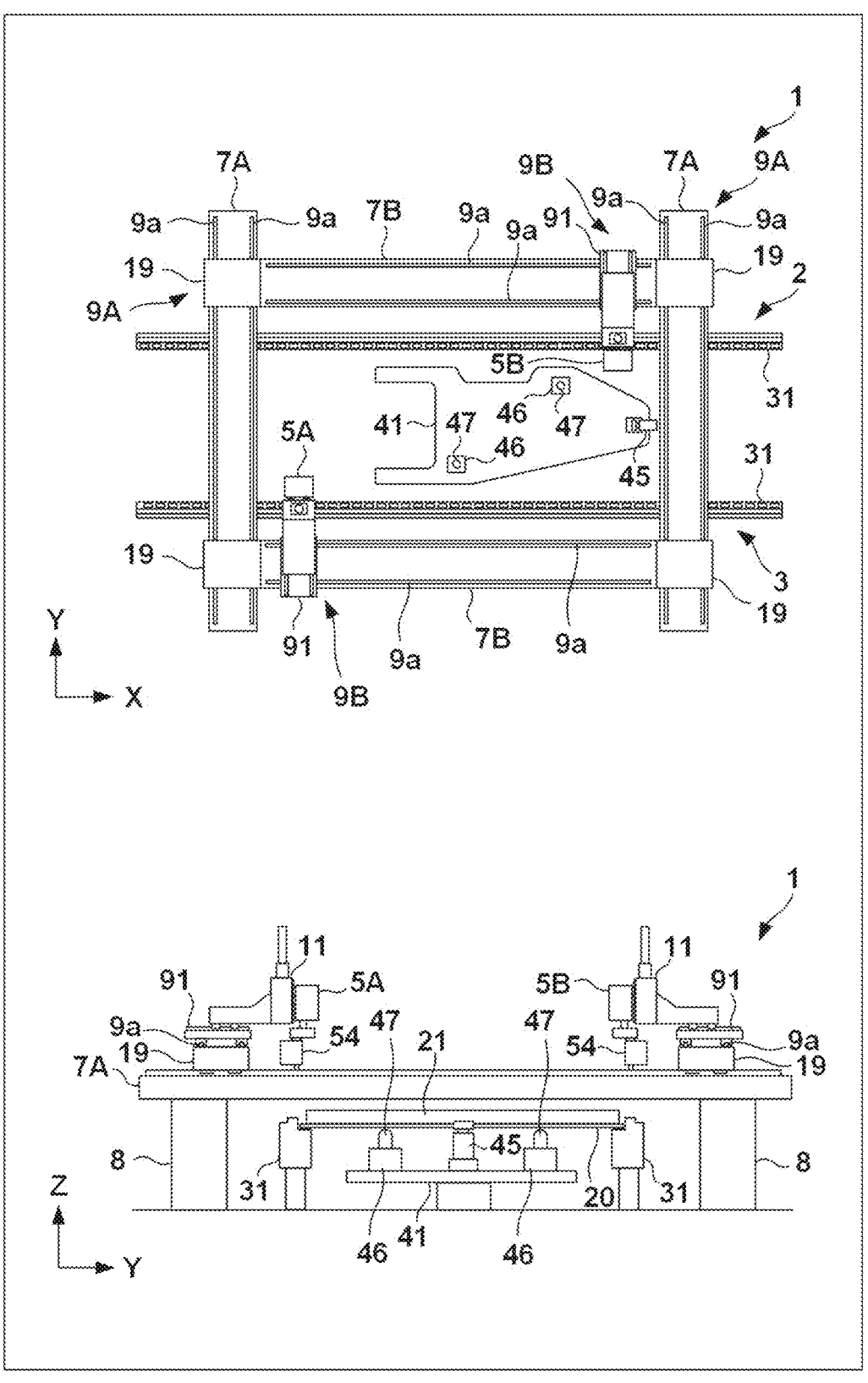
FIG. 20 shows a plan view and a right side view of a wire bonding apparatus according to still another embodiment.

FIG. 20 shows still another arrangement example of the moving device 6. In the example shown in FIG. 20, two beam members 7A corresponding to the beam member 7 are provided separately in the X direction. That is, two gate-shaped structures (each including the beam members 7A and the pair of columnar members 8) are provided. Movable beam members 7B are built across the two beam members 7A. There are provided the two movable beam members 7B. Each movable beam member 7B extends in the X direction.

Each beam member 7A is provided with a moving mechanism 9A. The moving mechanism 9A is a mechanism that is supported on the beam member 7A and moves the head 5 in the Y direction. The moving mechanism 9A includes a pair of guide rails 9*a* provided on the beam member 7A and two sliders 19 that are guided by the pair of guide rails 9*a* to move in the Y direction. The pair of guide rails 9*a* of the moving mechanism 9A are separated from each other in the X direction and extend in the Y direction. The movable beam member 7B is supported on the two sliders 19 separated from each other in the X direction. For the movement of the sliders 19, the moving mechanism 9A has, for example, a linear motor drive mechanism. However, the moving mechanism 9A may be a ball screw mechanism or rack and pinion mechanism. Making the two sliders 19 move the corresponding movable beam members 7B in the Y direction can move the head 5 in the Y direction.

Each movable beam member 7B is provided with a second moving mechanism 9B. The second moving mechanism 9B is a mechanism that is supported on the movable beam member 7B and moves the head 5 in the X direction. The second moving mechanism 9B includes a pair of guide rails 9*a* provided on the movable beam member 7B and a slider 91 that is guided by the pair of guide rails 9*a* to move in the Y direction. The pair of guide rails 9*a* of the second moving mechanism 9B are separated from each other in the Y direction and extend in the X direction. The slider 91 is provided for each head 5. For the movement of the sliders 91, the second moving mechanism 9B has, for example, a linear motor drive mechanism. However, the second moving mechanism 9B may be a ball screw mechanism or rack and pinion mechanism.

The apparatus 1 in FIG. 20 is a structure in which the head 5 can move on the movable beam members 7B in the X direction and can also move in the Y direction as the movable beam members 7B move. This makes it possible to perform wire bonding work without discriminating the X1 to X4 regions shown in FIG. 5. Accordingly, the apparatus 1 does not include the sub-conveying device 4 as a conveying mechanism for the work 21 but include a table 41 whose position is fixed and components (a stopper 45, an engaging portion 47, and a lifting unit 46) mounted on the table 41.

The apparatus 1 in FIG. 20 operates as follows. For example, after the pallet 20 and the work 21 are stopped by the stopper 45, each head 5 moves in the X and Y directions to perform wire bonding work for each assigned region on the work 21.

In the embodiment shown in FIG. 20, the heads 5A and 5B can be moved outside the conveying device 2 in the Y direction. This provides the worker with high accessibility to the head 5 and enables the worker to smoothly perform maintenance work.

Other Embodiments

Each embodiment described above has exemplified the arrangement example using the two heads 5A and 5B. However, one head 5 or three or more heads 5 may be used.

While an embodiment has been described, the invention is not limited to the foregoing embodiments, and various variations/changes are possible within the spirit of the invention.

What is claimed is:

1. A wire bonding apparatus comprising:
   a conveying unit configured to convey in a first direction a pallet on which a work is placed;
   at least one bonding head configured to perform wire bonding for the work; and
   a moving unit configured to move the at least one bonding head,
   the moving unit including
   a beam member located above the conveying unit and extending in a second direction intersecting the first direction so as to cross the conveying unit,
   a first columnar member configured to support one end portion of the beam member, a second columnar member configured to support the other end portion of the beam member, and a first moving mechanism configured to be supported on the beam member and move the at least one bonding head in the second direction, the conveying unit including a first conveying unit configured to convey the pallet to a work region where the at least one bonding head performs work for the work, and a second conveying unit configured to convey the pallet in the work region, the second conveying unit including a table with a positioning unit configured to positioning the pallet, a second moving mechanism configured to repeat moving the table in the first direction and stopping the table, wherein the at least one bonding head performs work for the work placed on the pallet located in the work region while the second moving mechanism stops, and wherein a positioning state of the pallet by the positioning unit is kept while the pallet is conveyed by the second conveying unit, and the at least one bonding head performs work for the work.

2. The wire bonding apparatus according to claim 1, wherein the first moving mechanism includes:

an extending portion configured to extend in the second direction; and a slider provided with the extending portion and configured to support the at least one bonding head so that the at least one bonding head is movable in the second direction, the extending portion includes:

a work zone portion configured to support the slider so that the at least one bonding head is located in a work zone where the at least one bonding head performs work for the work located in the work region; and at least one standby zone portion located on one side and/or the other side of the work zone portion in the second direction, and configured to support the slider so that the at least one bonding head is located in at least one standby zone that is located on one side and/or the other side of the work zone in the second direction.

3. The wire bonding apparatus according to claim 1, wherein the at least one bonding head includes a first bonding head and a second bonding head, the first moving mechanism includes:

an extending portion configured to extend in the second direction; and a first slider provided with the extending portion and configured to be capable of moving the first bonding head in the second direction, a second slider provided with the extending portion and configured to be capable of moving the second bonding head in the second direction, the extending portion includes:

a work zone portion configured to support the first slider and the second slider so that the first bonding head and the second bonding head are located in a work zone where the first bonding head and the second bonding head perform work for the work located in the work region; and a first standby zone portion located on one side of the work zone portion in the second direction, and configured to support the first slider so that the first bonding head is located in a standby zone located on one side of the work zone in the second direction, a second standby zone portion located on the other side of the work zone portion in the second direction, and configured to support the second slider so that the second bonding head is located in a standby zone located on the other side of the work zone in the second direction, moving manners of the first bonding head and the second bonding head by the first moving mechanism includes:

a moving manner in which the first bonding head and the second bonding head are located in the work zone;

a moving manner in which the first bonding head is located in the first standby zone, and the second bonding head is located in the work zone; and a moving manner in which the second bonding head is located in the second standby zone, and the first bonding head is located in the work zone.

4. The wire bonding apparatus according to claim 1, wherein the positioning unit comprises:

an engaging portion configured to position the pallet in a horizontal direction by engaging with the pallet; and a lifting unit configured to move the engaging portion upward and downward.

5. The wire bonding apparatus according to claim 1, further comprising:

an abutment member configured to come into contact with the work and/or the pallet from above in the work region; and a lifting unit configured to move the abutment member upward and downward.

6. The wire bonding apparatus according to claim 1, wherein the moving unit includes an advancing/retracting mechanism provided between the first moving mechanism and the at least one bonding head and configured to make the at least one bonding head advance/retract in the first direction.

7. The wire bonding apparatus according to claim 1, wherein the at least one bonding head includes:

a tool portion configured to perform wire bonding; and a turning mechanism configured to turn the tool portion about a vertical axis so as to change a direction of the tool portion.

8. The wire bonding apparatus according to claim 7, wherein the moving unit comprises a head lifting unit configured to move the at least one bonding head upward and downward, and the at least one bonding head comprises a sensor configured to detect a load acting on the tool portion in a vertical direction when a distal end of the tool portion comes into contact with the work.

9. The wire bonding apparatus according to claim 1, further comprising:

a reading unit configured to read information from the work and/or the pallet; and a control unit configured to control the conveying unit, the moving unit and the at least one bonding head, wherein the control unit controls the conveying unit, the moving unit and the at least one bonding head based on the information read by the reading unit.

10. The wire bonding apparatus according to claim 1, further comprising:

an imaging unit configured to image the work; and a control unit configured to control the conveying unit, the moving unit and the at least one bonding head, wherein the control unit is configured to control an operation of the conveying unit, the moving unit and the at least one bonding head based on an image captured by the imaging unit.

11. The wire bonding apparatus according to claim 6, further comprising a control unit configured to control the conveying mean, the moving unit and the at least one bonding head, wherein the at least one bonding head includes a tool portion configured to perform wire bonding, and the control unit controls the first moving mechanism so as to perform an alignment of the tool portion in the second direction, and controls the advancing/retracting mechanism so as to perform an alignment of the tool portion in the first direction.

12. The wire bonding apparatus according to claim 2, further comprising a control unit configured to control the conveying mean, the moving unit and the at least one bonding head, wherein the at least one bonding head includes a first bonding head and a second bonding head, the control unit controls moving of the first bonding head from one end of the work zone in the second direction to the other end side in the second direction with the first bonding head working, and controls moving of the second bonding head from a central position of the work zone in the second direction to the other end side in the second direction with the second bonding head working.

13. The wire bonding apparatus according to claim 12, wherein the first bonding head includes:

a first tool portion configured to perform wire bonding; and a first turning mechanism configured to turn the first tool portion about a vertical axis so as to change a direction of the first tool portion, the second bonding head includes:

a second tool portion configured to perform wire bonding; and a second turning mechanism configured to turn the second tool portion about a vertical axis so as to change a direction of the second tool portion, the control unit performs a control in which the first tool portion of the first bonding head is reversed by the first turning mechanism after the first bonding head reaches a central position of the work zone in the second direction, the first bonding head is moved to one side of the second direction with the first bonding head working, the second tool portion of the second bonding head is reversed by the second turning mechanism after the second bonding head reaches the other end of the work zone in the second direction, and the second bonding head is moved to the one side of the second direction with the second bonding head working.

14. The wire bonding apparatus according to claim 1, wherein the first conveying unit comprises a pair of conveyors which extends in the first direction and are separated from each other, and the pallet is supported by the pair of conveyors from below.

15. The wire bonding apparatus according to claim 14, wherein the second conveying unit is arranged between the pair of conveyors in the second direction.

16. A control method of a wire bonding apparatus including: a conveying unit configured to convey in a first direction a pallet on which a work is placed; at least one bonding head configured to perform wire bonding for the work; and a moving unit configured to move the at least one bonding head, the moving unit including: a beam member located above the conveying unit and extending in a second direction intersecting the first direction so as to cross the conveying unit; a first columnar member configured to support one end portion of the beam member; a second columnar member configured to support the other end portion of the beam member; and a first moving mechanism supported on the beam member and configured to move the at least one bonding head in the second direction, the conveying unit including: a first conveying unit configured to convey the pallet to a work region where the at least one bonding head performs work for the work; and a second conveying unit configured to convey the pallet in the work region, the second conveying unit including: a table with a positioning unit configured to positioning the pallet; and a second moving mechanism configured to repeat moving the table in the first direction and stopping the table, the method comprising a first conveying step of conveying the pallet to the work zone by the first conveying unit, a positioning step of positioning the pallet conveyed in the work zone by the positioning unit, a working step of working, by the at least one bonding head, the work placed on the pallet positioned by the positioning unit, a moving step of moving, by the second moving mechanism, the pallet in a state in which the positioning unit positions the pallet, a stop step of stopping moving the pallet by the second moving mechanism while the positioning unit positions the pallet, a cancel step of cancelling positioning of the pallet by the positioning unit after the working step, the moving step and the stop step are repeated multiple times, and a second conveying step of conveying the pallet by the first conveying unit outside the work zone.

* * * * *